(12) United States Patent
Saitou

(10) Patent No.: US 9,806,830 B2
(45) Date of Patent: Oct. 31, 2017

(54) SEMICONDUCTOR DEVICE, RADIO COMMUNICATION DEVICE, AND CONTROL METHOD FOR RADIO COMMUNICATION DEVICE

(71) Applicant: Renesas Electronics Corporation, Tokyo (JP)

(72) Inventor: Tatsuhito Saitou, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/068,342

(22) Filed: Mar. 11, 2016

(65) Prior Publication Data
US 2016/0301485 A1 Oct. 13, 2016

(30) Foreign Application Priority Data

Apr. 9, 2015 (JP) .................................. 2015-079729

(51) Int. Cl.
| | | |
|---|---|---|
| H04B 17/00 | (2015.01) | |
| H04B 17/318 | (2015.01) | |
| H04W 52/02 | (2009.01) | |
| H04B 17/20 | (2015.01) | |

(52) U.S. Cl.
CPC ........... *H04B 17/318* (2015.01); *H04B 17/20* (2015.01); *H04W 52/0232* (2013.01); *H04W 52/0238* (2013.01); *H04W 52/0245* (2013.01); *Y02B 60/50* (2013.01)

(58) Field of Classification Search
USPC .................................................... 455/67.11
See application file for complete search history.

(56) References Cited

U.S. PATENT DOCUMENTS

| | | | |
|---|---|---|---|
| 6,044,253 A | 3/2000 | Tsumura | |
| 2004/0081260 A1* | 4/2004 | Matsusaka | H04L 1/0003 375/340 |
| 2004/0092238 A1 | 5/2004 | Filipovic | |
| 2005/0130687 A1 | 6/2005 | Filipovic et al. | |
| 2006/0079196 A1* | 4/2006 | Atsumi | H04B 17/318 455/313 |

(Continued)

FOREIGN PATENT DOCUMENTS

| | | |
|---|---|---|
| GB | 2 317 514 A | 3/1998 |
| JP | 2006-109323 A | 4/2006 |

OTHER PUBLICATIONS

Extended European Search Report dated Jul. 20, 2016.

*Primary Examiner* — Ganiyu A Hanidu
(74) *Attorney, Agent, or Firm* — McGinn IP Law Group, PLLC.

(57) ABSTRACT

A semiconductor device capable of reducing its power consumption is provided. A semiconductor device includes a receiving unit that receives a radio signal, a received signal strength measurement unit that measures a signal strength of the radio signal received by the receiving unit, a threshold comparison unit that compares the received signal strength measured by the received signal strength measurement unit with a threshold, a demodulation unit that demodulates the radio signal received by the receiving unit based on a result of the comparison, and a threshold setting unit that sets the threshold according to the received signal strength measured by the received signal strength measurement unit.

20 Claims, 17 Drawing Sheets

(56) References Cited

U.S. PATENT DOCUMENTS

| | | | |
|---|---|---|---|
| 2007/0126553 A1* | 6/2007 | Park | H04B 5/0056 340/10.1 |
| 2010/0248665 A1* | 9/2010 | Jonsson | H03G 3/3078 455/140 |
| 2016/0249268 A1* | 8/2016 | Usui | H04W 16/32 |

* cited by examiner

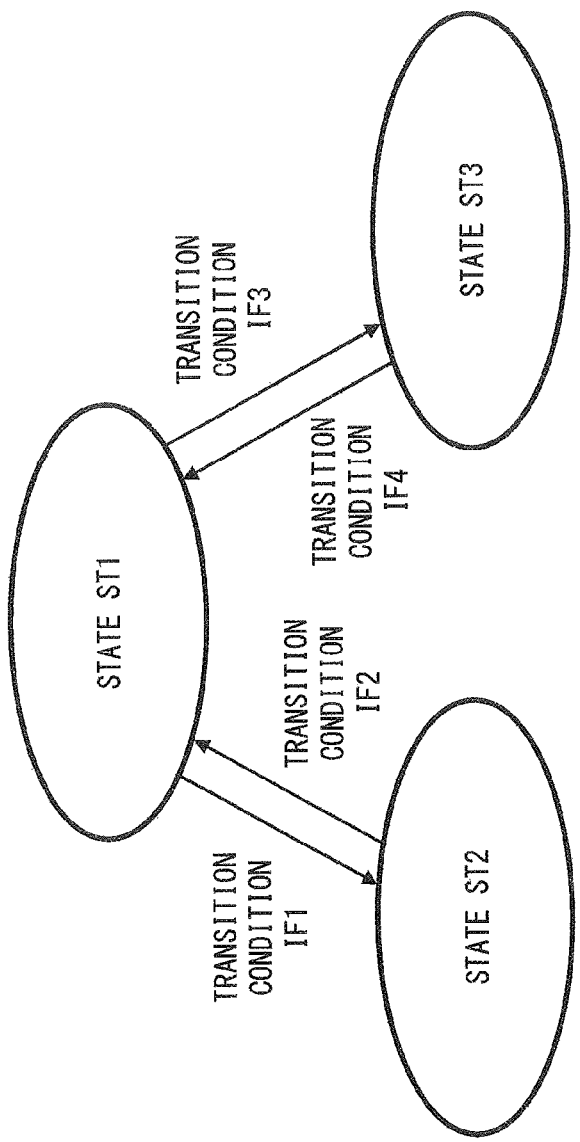

Fig. 11

| CONDITION NAME | TRANSITION CONDITION |
|---|---|
| TRANSITION CONDITION IF1 | THE NUMBER OF TIMES OF "RECEIVED ELECTRIC FIELD STRENGTH SI < -40dBm" EXCEEDS cnt_th_M2L IN A ROW |
| TRANSITION CONDITION IF2 | THE NUMBER OF TIMES OF "RECEIVED ELECTRIC FIELD STRENGTH SI > -45dBm" EXCEEDS cnt_th_L2M IN A ROW |
| TRANSITION CONDITION IF3 | THE NUMBER OF TIMES OF "RECEIVED ELECTRIC FIELD STRENGTH SI > -90dBm" EXCEEDS cnt_th_M2H IN A ROW |
| TRANSITION CONDITION IF4 | THE NUMBER OF TIMES OF "RECEIVED ELECTRIC FIELD STRENGTH SI < -85dBm" EXCEEDS cnt_th_H2M IN A ROW |

| STATE NAME | POWER THRESHOLD TH |
|---|---|
| STATE ST1 | −90dBm |
| STATE ST2 | −60dBm |
| STATE ST3 | −95dBm |

Fig. 12

| INPUT | | OUTPUT | | |
|---|---|---|---|---|
| RECEIVED ELECTRIC FIELD STRENGTH SI [dBm] | | POWER THRESHOLD TH [dBm] | TRANSMISSION POWER SP [dBm] | RECEPTION GAIN RG [dB] |
| −39 OR LARGER | | −60 | −15 | 60 |
| −40 TO −89 | | −90 | 0 | 70 |
| −90 OR SMALLER | | −95 | 2 | 76 |

SEMICONDUCTOR DEVICE, RADIO COMMUNICATION DEVICE, AND CONTROL METHOD FOR RADIO COMMUNICATION DEVICE

CROSS-REFERENCE TO RELATED APPLICATIONS

This application is based upon and claims the benefit of priority from Japanese patent application No. 2015-079729, filed on Apr. 9, 2015, the disclosure of which is incorporated herein in its entirety by reference.

BACKGROUND

The present invention relates to a semiconductor device, a radio communication device, and a control method for a radio communication device. For example, the present invention can be suitably applied to a semiconductor device that measures the strength of a received signal (hereinafter referred to as a "received signal strength"), a radio communication device, and a control method for a radio communication device.

Recently, radio communication techniques have been used in various electronic apparatuses such as mobile phones, smart phones, IoT (Internet of Things) devices, and wearable devices. As examples of the radio communication techniques, a wireless LAN, Bluetooth (registered trademark), and Zigbee (registered trademark) have been known.

Japanese Unexamined Patent Application Publication No. 2006-109323 discloses a related art. In Japanese Unexamined Patent Application Publication No. 2006-109323, power consumption is reduced by controlling a threshold by which a decision on an RSSI (Received Signal Strength Indication) is made.

SUMMARY

The present inventors have found the following problem. In the related art such as the one disclosed in Japanese Unexamined Patent Application Publication No. 2006-109323, there are cases in which it is very difficult to reduce the consumption power depending on the radio-wave state, such as the presence of interfering radio waves. Therefore, in one embodiment, one of the problems is to reduce the consumption power.

Other problems and novel features will be more apparent from the following description in the specification and the accompanying drawings.

According to one embodiment, a radio communication device includes an antenna and a semiconductor device. The semiconductor device receives a radio signal through the antenna and measures a received signal strength of the received radio signal. Further, the semiconductor device compares the measured received signal strength with a threshold, demodulates the received radio signal based on a result of the comparison, and sets the threshold according to the measured received signal strength.

According to the embodiment, the power consumption can be reduced.

BRIEF DESCRIPTION OF THE DRAWINGS

The above and other aspects, advantages and features will be more apparent from the following description of certain embodiments taken in conjunction with the accompanying drawings, in which:

FIG. 11 is a state machine diagram showing state transitions of a semiconductor device according to a second embodiment;

FIG. 12 shows an example of a power threshold table according to the second embodiment;

FIG. 16 shows an example of a control table according to the third embodiment.

DETAILED DESCRIPTION

Figure 1:
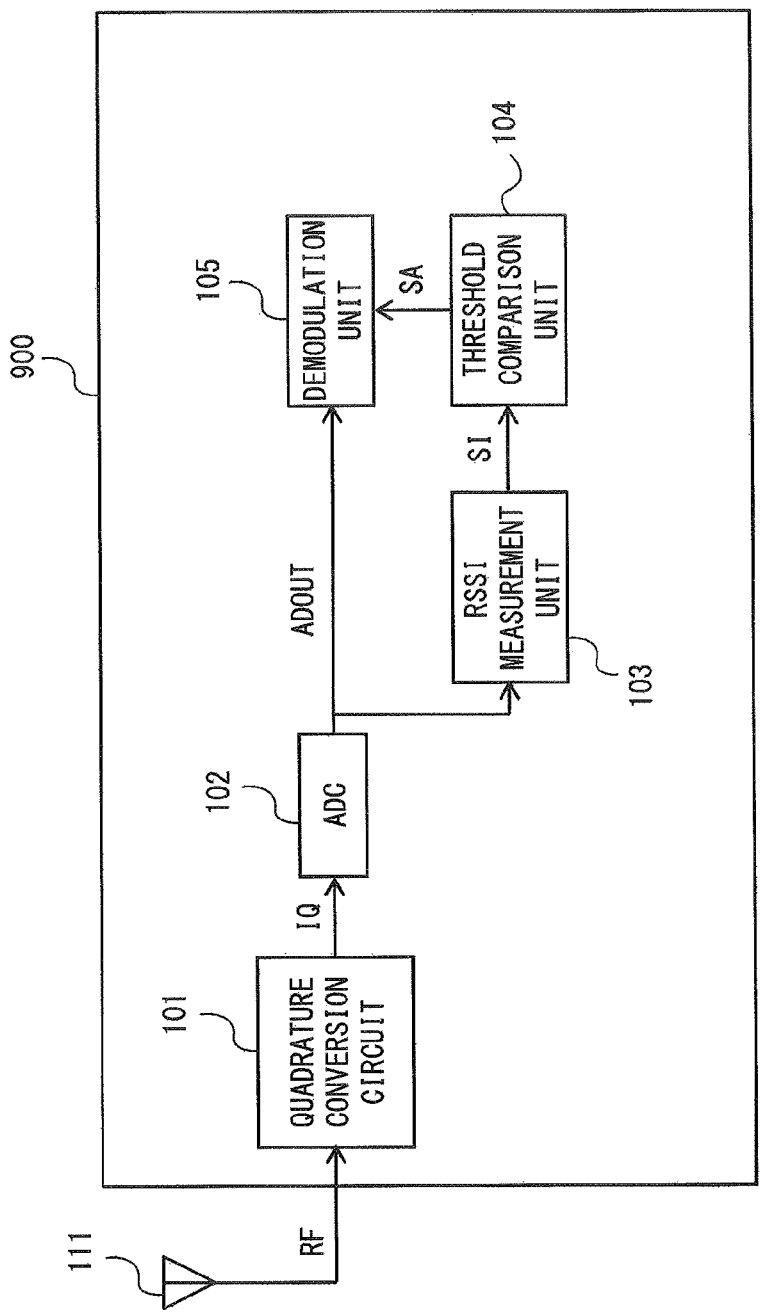
FIG. 1 is a configuration diagram showing a configuration of a semiconductor device according to a reference example 1.

For clarifying the explanation, the following descriptions and the drawings may be partially omitted and simplified as appropriate. Further, each of the elements that are shown in the drawings as functional blocks for performing various processes can be implemented by hardware such as a CPU, a memory, and other types of circuits, or implemented by software such as a program loaded in a memory. Therefore, those skilled in the art will understand that these functional blocks can be implemented solely by hardware, solely by software, or a combination thereof. That is, they are limited to neither hardware nor software. Note that the same symbols are assigned to the same components throughout the drawings and duplicated explanations are omitted as required.

(Examination Leading to Embodiment)

Recently, research on perform radio communication with lower power consumption has been underway. For example, Bluetooth Low Energy (BLE), which consumes lower power, has been standardized as the new Bluetooth standard. Further, IoT devices and wearable devices have been receiving attention. As the sizes of such devices have been increasingly reduced, it has been strongly desired to reduce the power requirement in order to reduce the trouble of replacing batteries and/or recharging batteries. Therefore, firstly, reference examples 1 and 2, to which an embodiment according to an embodiment is not applied, are examined.

The reference example 1 is an example in which demodulation starts when the RSSI of a received signal exceeds a threshold. FIG. 1 shows a configuration of a semiconductor device 900 according to the reference example 1. The semiconductor device 900 is a radio receiver that receives a radio signal. As shown in FIG. 1, the semiconductor device 900 according to the reference example 1 includes a quadrature conversion circuit 101, an ADC (Analog-to-Digital Converter) 102, an RSSI measurement unit 103, a threshold comparison unit 104, and a demodulation unit 105.

An antenna 111 supplies a received radio signal RF to the semiconductor device 900. The quadrature conversion circuit 101 generates a quadrature signal IQ based on the radio signal RF and the ADC 102 generates an ADC output code ADOUT based on the quadrature signal IQ. The RSSI measurement unit 103 measures the strength SI of a received electric field (hereinafter referred to as a "received electric field strength SI") of the radio signal RF based on the ADC output code ADOUT. The threshold comparison unit 104 compares the received electric field strength SI with a power threshold TH and outputs a receiving start signal SA according to the comparison result. The demodulation unit 105 demodulates the ADC output code ADOUT according to (or in response to) the receiving start signal SA.

Figure 2:
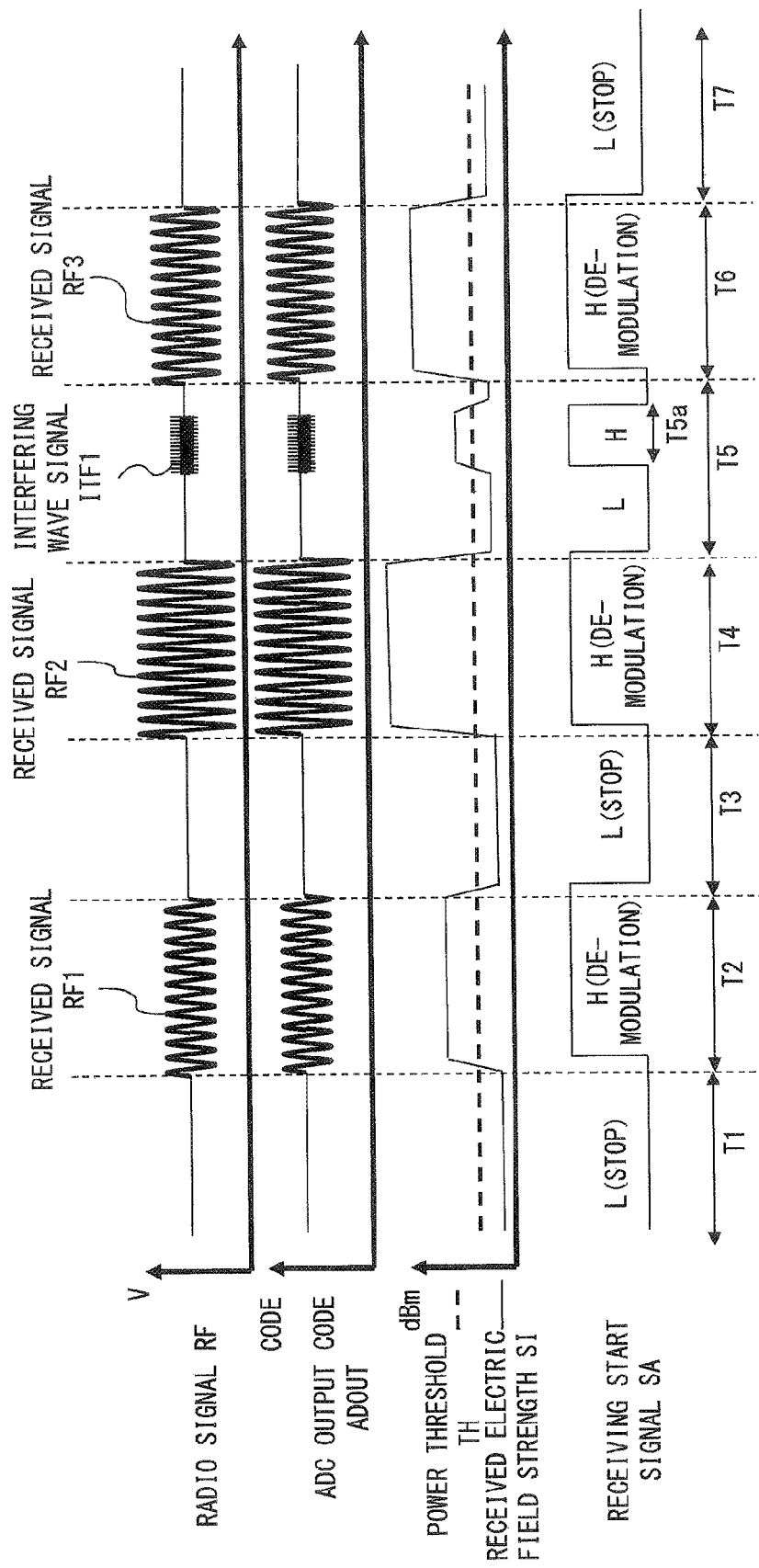
FIG. 2 is a signal waveform chart showing an operation of the semiconductor device according to the reference example 1.

FIG. 2 is a signal waveform chart showing an operation example of the semiconductor device 900 according to the reference example 1. FIG. 2 shows signal waveforms of the radio signal RF, the ADC output code ADOUT, the power threshold TH and the received electric field strength SI, and the receiving start signal SA. In FIG. 2, the horizontal axis of each of these charts indicates the lapse of time. Further, the vertical axes of the radio signal RF, the ADC output code ADOUT, the power threshold TH and the received electric field strength SI, and the receiving start signal SA indicate voltage levels (V), code values (CODE), power dBm, and high (H)/low (L) levels, respectively. In this example, radio signals RF1, RF2 and RF3 are received one after another at regular intervals in periods T2, T4 and T6, respectively, and an interfering radio-wave signal ITF1 is received in a period between the receptions of the received signals RF2 and RF3.

Since no radio signal is received in periods T1, T3 and T7, the received electric field strength SI is lower than the power threshold TH in these periods. Therefore, the threshold comparison unit 104 sets the receiving start signal SA to a low level and the demodulation unit 105 performs no demodulation operation. Further, the received signals RF1, RF2 and RF3 are received in the periods T2, T4 and T6, respectively, and hence the received electric field strength SI is higher than the power threshold TH in these periods. Therefore, the threshold comparison unit 104 sets the receiving start signal SA to a high level and the demodulation unit 105 starts (i.e., performs) a demodulation operation.

In the semiconductor device 900 according to the reference example 1, the power threshold TH is a permanently fixed value. Therefore, when the semiconductor device 900 receives the interfering radio-wave signal ITF1 in a period T5a in the period T5, the received electric field strength SI becomes larger than the power threshold TH. As a result, the threshold comparison unit 104 sets the receiving start signal SA to a high level and the demodulation unit 105 starts (i.e., performs) demodulation for the interfering radio-wave signal ITF1.

Therefore, there is a problem in the reference example 1, in which the power threshold TH is fixed, that when an interfering radio-wave signal is received, the demodulation unit 105 starts a demodulation operation and hence the current consumption (power consumption) increases in the demodulation unit 105. Further, if the demodulation of a normal received signal (such as the received signal RF3) ends in failure due to the influence of an interfering radio-wave signal, the transmission side performs the transmission process again, thus further increasing the current consumption.

Figure 3:
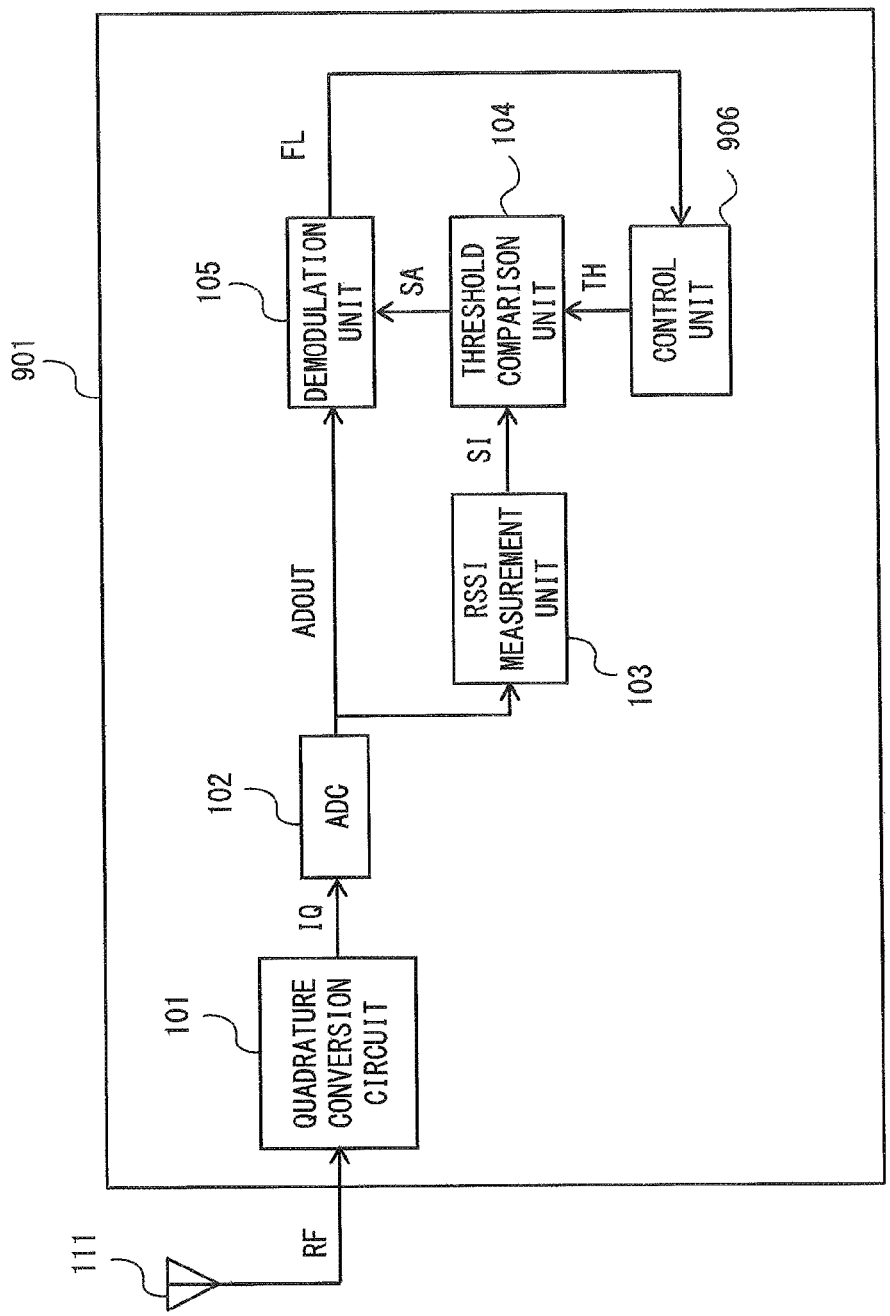
FIG. 3 is a configuration diagram showing a configuration of a semiconductor device according to a reference example 2.

In contrast to this, the reference example 2 is an example in which a threshold by which a decision on the RSSI of a received signal is made is controlled according to a demodulation result of a received signal. FIG. 3 shows a configuration of a semiconductor device 901 according to the reference example 2. As shown in FIG. 3, the semiconductor device 901 according to the reference example 2 includes a control unit 906 in addition to the configuration of the reference example 1 shown in FIG. 1.

In the reference example 2, the demodulation unit 105 outputs an error detection result FL (flag) indicating whether or not there is an error in a demodulation result of a received signal. The control unit 906 estimates a radio-wave state based on the error detection result FL, and raises the power threshold TH when the interfering radio wave is estimated to be large and lowers the power threshold TH when the interfering radio wave is estimated to be small. By doing so, the control unit 906 prevents the threshold comparison unit 104 from mistakenly detecting an interfering radio wave as being a normal received signal.

Figure 4:
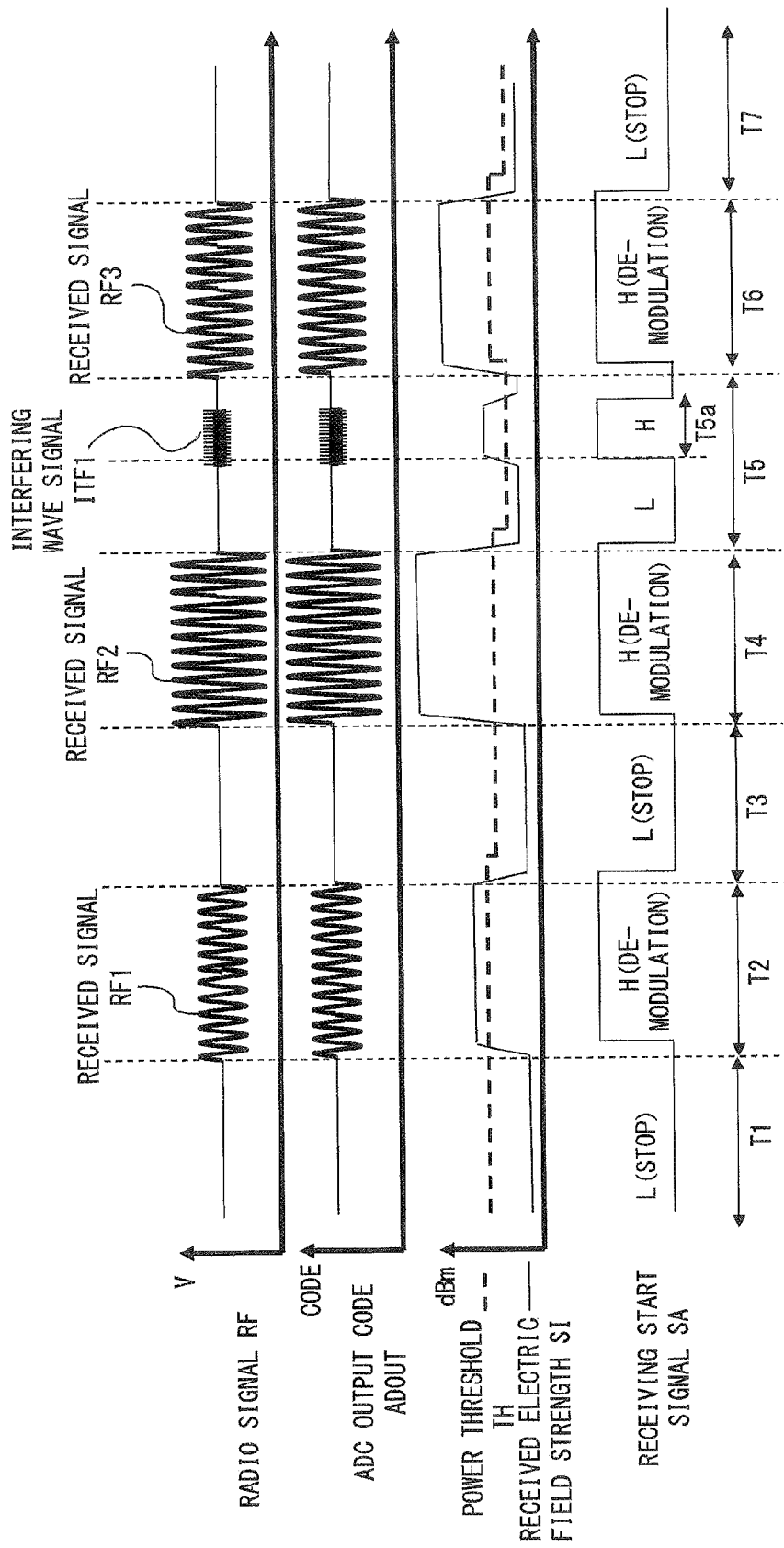
FIG. 4 is a signal waveform chart showing an operation of the semiconductor device according to the reference example 2.

FIG. 4 is a signal waveform chart showing an operation example of the semiconductor device 901 according to the reference example 2. Similarly to FIG. 2, in the example shown in FIG. 4, radio signals RF1, RF2 and RF3 are received one after another at regular intervals in periods T2, T4 and T6, respectively, and an interfering radio-wave signal ITF1 is received in a period between the receptions of the received signals RF2 and RF3.

In the semiconductor device 901 according to the reference example 2, the power threshold is determined by using the error detection result FL. Therefore, when no error occurs in the received signals RF1 and RF2 in the periods T2 and T4, respectively, in which there is no interfering radio-wave signal, the power threshold TH is gradually lowered. When an interfering radio-wave signal is received in a period T5a in the period T5 after the power threshold TH is lowered, the received electric field strength SI of the interfering radio-wave signal ITF1 received at the antenna becomes larger than the power threshold TH. Therefore, the threshold comparison unit 104 sets the receiving start signal SA to a high level and the demodulation unit 105 starts the demodulation of the interfering radio-wave signal ITF1.

Therefore, even in the reference example 2, in which the power threshold TH is controlled according to the demodulation result, there is a problem that when an interfering radio-wave signal is received, the demodulation unit 105 starts a demodulation operation and hence the current consumption is increased, as in the case of the reference example 1.

Note that the characteristic of the reference example 2 is expected to significantly improve under the condition that interfering radio waves occur continuously over time and their power is substantially unchanged. However, communication methods which could cause interfering radio waves, such as a wireless LAN, Bluetooth, and Zigbee, are packet communication methods. Therefore, they cause interfering radio waves that are discontinuous on a packet-by-packet basis. Further, the power of received interfering radio waves changes as the terminal that is outputting the interfering radio wave moves. It can be said that since the reference example 2 has a configuration in which the power threshold for the next reception is changed based on the result of the error detection result FL having a binary value (i.e., based on the presence/absence of an error), the appropriate power threshold could change between when the power threshold is determined and when a received signal is received due to the change in the power of the interfering radio wave over time, thus causing the receiving circuit to mistakenly start up due to the interfering radio wave and thereby causing an increase in the current consumption and deterioration in the reception characteristic.

Outline of Embodiment

Figure 5:
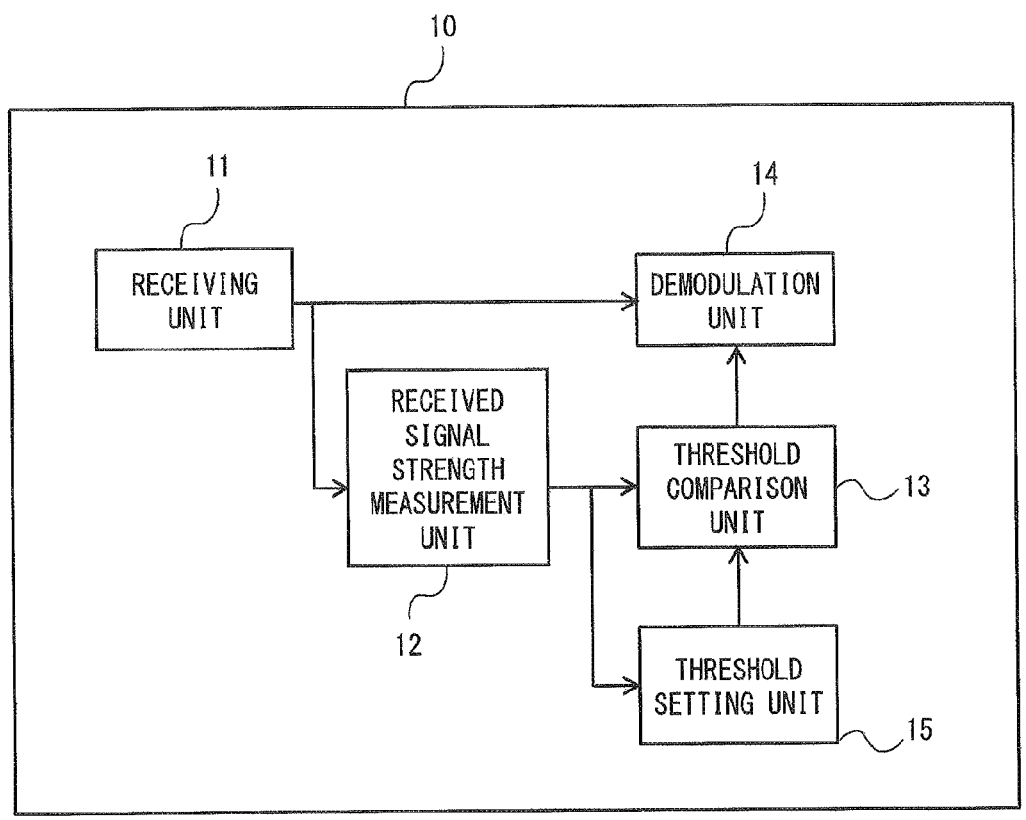
FIG. 5 is a configuration diagram showing an outline of a semiconductor device according to an embodiment.

FIG. 5 shows an example of an outline of a semiconductor device according to an embodiment. As shown in FIG. 5, a semiconductor device 10 according to an embodiment includes a receiving unit 11, a received signal strength measurement unit 12, a threshold comparison unit 13, a demodulation unit 14, and a threshold setting unit 15.

The receiving unit 11 receives a radio signal and the received signal strength measurement unit 12 measures the received signal strength of the radio signal received by the receiving unit 11. The threshold comparison unit 13 compares the received signal strength measured by the received signal strength measurement unit 12 with a threshold and the demodulation unit 14 demodulates the radio signal received by the receiving unit 11 based on the result of the comparison performed by the threshold comparison unit 13. Further, the threshold setting unit 15 sets the threshold in the threshold comparison unit 13 according to the received signal strength measured by the received signal strength measurement unit 12.

As described above, in the embodiment, the threshold by which the start of demodulation is determined is set (i.e., changed) according to the received signal strength of the received radio signal. In this way, since an appropriate threshold can be set according to the received signal strength, it is possible to prevent a false operation that would otherwise occur when an interfering radio wave is received and thereby to reduce the power consumption.

First Embodiment

A first embodiment is explained hereinafter with reference to the drawings.

<Configuration of Radio Communication System>

Figure 6:
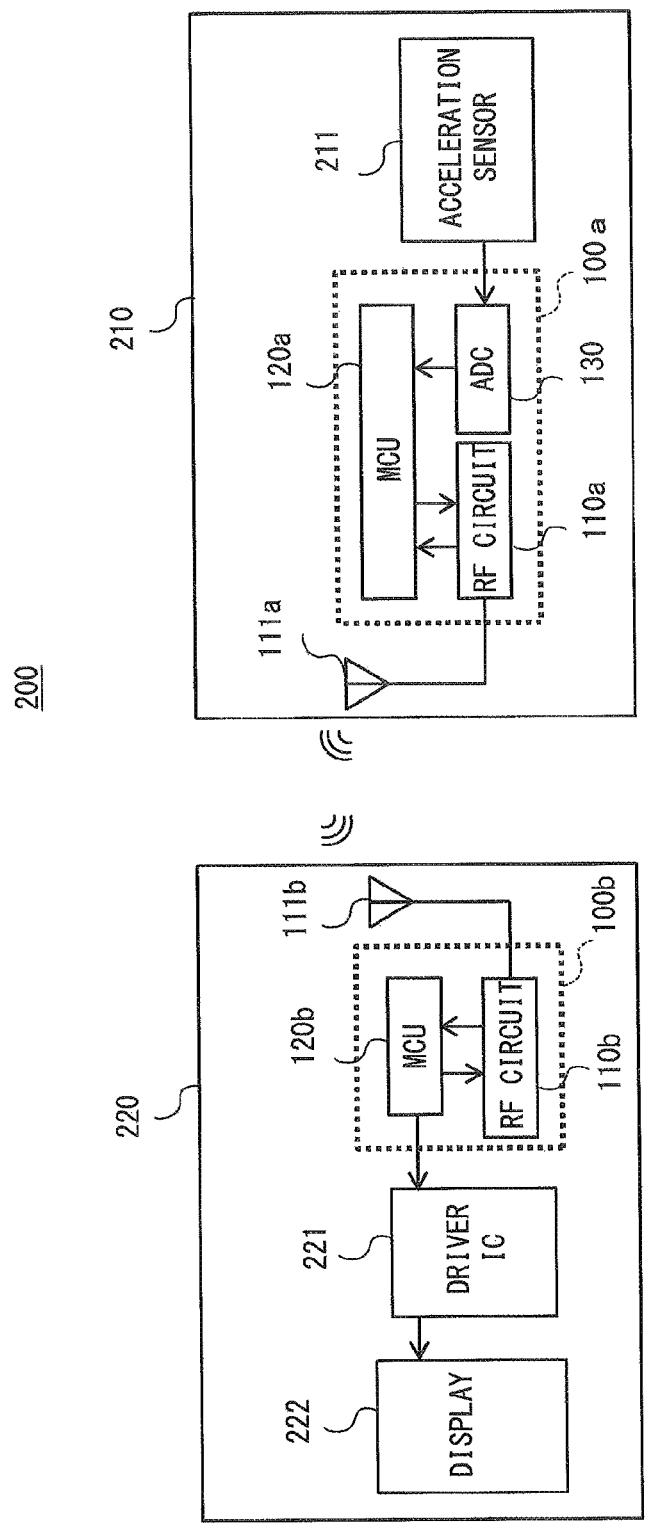
FIG. 6 is a configuration diagram showing a configuration of a radio communication system according to a first embodiment.

FIG. 6 shows a configuration example of a radio communication system 200 according to this embodiment. As shown in FIG. 6, the radio communication system 200 according to this embodiment includes radio communication devices 210 and 220. The radio communication system 200 is an example in which an embodiment is applied to an activity meter application. Note that the embodiment can be applied to an application other than the activity meter application, provided that the application can perform a radio communication such as Bluetooth.

The radio communication device 210 is an active meter module such as a pedometer and transmits the detected number of steps to the radio communication device 220. The radio communication device 220 is a display module such as a smart phone and displays the number of steps received from the radio communication device 210. For example, in the case of adopting Bluetooth as its communication method, the radio communication device 220 serves as a master device and the radio communication device 210 serves as a slave device. One radio communication device 220 (master device) may be wirelessly connected to one radio communication device 210 (slave device). Alternatively, one radio communication device 220 may be wirelessly connected to a plurality of radio communication devices 210.

The radio communication device 210 includes an antenna 111a, a semiconductor device 100a, and an acceleration sensor 211. The semiconductor device 100a includes an RF circuit 110a, an MCU 120a, and an ADC 130.

In the radio communication device 210, the acceleration sensor 211 detects an acceleration and generates an acceleration voltage according to the detected acceleration. The ADC 130 converts the analog acceleration voltage generated by the acceleration sensor 211 into a digital signal and thereby generates digital acceleration data (code). The MCU 120a generates a packet (transmission data) to be transmitted based on the acceleration data generated by the ADC 130. The RF circuit 110a modulates the packet (transmission data) generated by the MCU 120 and transmits the modulated signal to the radio communication device 220 through the antenna 111a. Further, the RF circuit 110a receives a radio signal transmitted from the radio communication device 220 through the antenna 111a and demodulates the received radio signal and thereby obtains a packet (received data). The MCU 120a performs a necessary process based on the packet (received data) demodulated (i.e., obtained) by the RF circuit 110a.

The radio communication device 220 includes an antenna 111b, a semiconductor device 100b, a driver IC 221, and a display 222. The semiconductor device 100b of the radio communication device 220 includes an RF circuit 110b and an MCU 120b.

In the radio communication device 220, the RF circuit 110b receives a radio signal transmitted from the radio communication device 210 through the antennal 111b and demodulates the received radio signal and thereby obtains a packet (received data). The MCU 120b acquires acceleration data based on the packet (received data) demodulated (i.e., obtained) by the RF circuit 110b. Further, the MCU 120b outputs the acquired acceleration data to the display 222 through the driver IC 221, and the display 222 displays the acceleration data (measured activity quantity).

The semiconductor devices 100a and 100b (either of them is also referred to as a "semiconductor device 100") of the radio communication devices 210 and 220, respectively, are semiconductor devices similar to each other, and serve as radio communication units that perform radio communication in accordance with a radio communication standard such as Bluetooth, a wireless LAN, and Zigbee. As an example, the semiconductor device 100b shown in FIG. 6, which has an MCU function and an RF function, may have other functions according to the need. Similarly, the semiconductor device 100a, which has an MCU function, an RF function, and an ADC function, may have other functions according to the need.

In this embodiment, in the semiconductor device 100a of the radio communication device 210 (e.g., the slave device), a distance between the radio communication devices 210 and 220 is estimated based on an RSSI measurement result that is obtained when the radio communication device 210 communicates with the radio communication device 220. Then, an optimal parameter(s) is determined according to the estimated distance by using a table or a calculation formula included in software of the MCU 120*a* and the determined parameter (s) is set in the RF circuit 110*a* (such as a register).

In this embodiment, the optimal parameter is a threshold by which an RSSI, which is used to trigger demodulation, is determined. Note that as described in a later-shown embodiment, the optimal parameter may include a transmission power setting and/or a reception gain setting. When the distance is short, the transmission power and/or the reception gain can be reduced and the power consumption of the RF circuit 110 is thereby reduced. On the other hand, when the distance is long, the communication available distance can be increased by increasing the transmission power and/or the reception gain.

Note that similarly to the semiconductor device 100*a* of the radio communication device 210, a parameter(s) may be controlled according to the distance (RSSI) in the semiconductor device 100*b* of the radio communication device 220 (e.g., the master device). For example, when the radio communication device 220 communicates with a plurality of radio communication devices 210, the radio communication device 220 may set a parameter(s) for each of the radio communication devices 210 according to its distance (RSSI).

<Configuration of Semiconductor Device>

Figure 7:
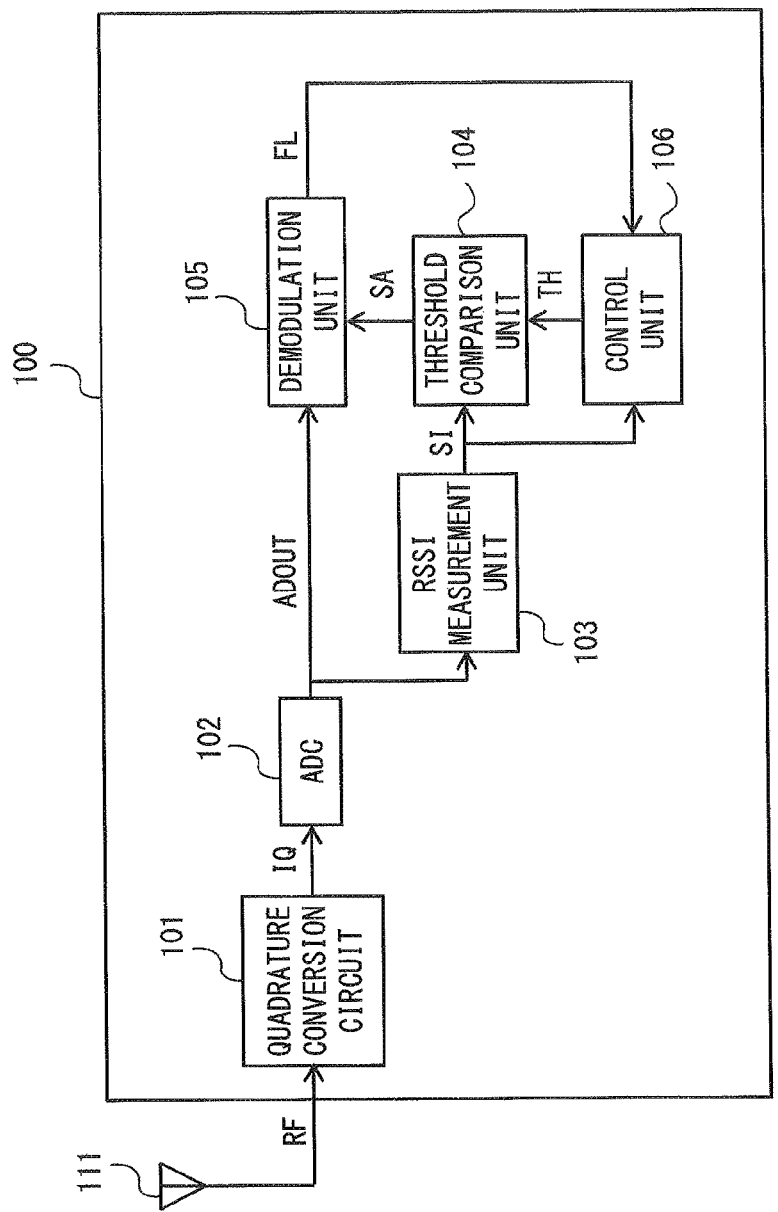
FIG. 7 is a configuration diagram showing a configuration of a semiconductor device according to the first embodiment.

FIG. 7 shows a configuration example of a semiconductor device 100 (the semiconductor device 100*a* or 100*b* shown in FIG. 6) according to this embodiment. FIG. 7 mainly shows a configuration of a signal receiving unit of the semiconductor device 100, which is a configuration of a receiver of the radio communication device. As shown in FIG. 7, the semiconductor device 100 according to this embodiment includes a quadrature conversion circuit 101, an ADC 102, an RSSI measurement unit 103, a threshold comparison unit 104, a demodulation unit 105, and a control unit 106. The configuration shown in FIG. 7 differs from the configuration of the reference example 2 shown in FIG. 3 in that the received electric field strength SI is also supplied from the RSSI measurement unit 103 to the control unit 106. Note that although FIG. 7 shows a Zero-IF type receiving architecture as an example, other receiving architectures such as a Low-IF type receiving architecture may be used. Further, although the IQ-separation is performed in the analog part (analog circuit) as an example in FIG. 7, the IQ-separation may be performed in the digital part (digital circuit). Still further, although the RSSI measurement unit 103 is formed by a digital circuit as an example in FIG. 7, the RSSI measurement unit 103 may be formed by an analog circuit.

For example, the RF circuit 110 (the RF circuit 110*a* or 110*b*) shown in FIG. 6 includes the quadrature conversion circuit 101, the ADC 102, the RSSI measurement unit 103, the threshold comparison unit 104, and the demodulation unit 105. Meanwhile, the MCU 120 (the MCU 120*a* or 120*b*) shown in FIG. 6 includes the control unit 106. The control unit 106 is implemented by having the MCU 120 execute a program.

The quadrature conversion circuit 101 performs a quadrature conversion on a radio signal RF received by the antenna 111 (the antenna 111*a* or 111*b*) and thereby generates a quadrature signal IQ. The ADC 102 converts the analog quadrature signal IQ generated by the quadrature conversion circuit 101 into a digital signal and thereby generates an ADC output code ADOUT. The RSSI measurement unit 103 measures the received electric field strength SI of the received radio signal RF based on the ADC output code ADOUT output from the ADC 102.

The threshold comparison unit 104 compares the received electric field strength SI measured by the RSSI measurement unit 103 with a power threshold TH and outputs a receiving start signal SA according to the comparison result. The demodulation unit 105 demodulates the ADC output code ADOUT output from the ADC 102 according to (or in response to) the receiving start signal SA output from the threshold comparison unit 104. The threshold comparison unit 104 compares the magnitude of the received electric field strength SI with the power threshold TH. When the received electric field strength SI becomes larger than the power threshold TH, the threshold comparison unit 104 determines that the semiconductor device 100 has received a packet and hence outputs the receiving start signal SA. Further, the demodulation unit 105 starts demodulation according to (or in response to) the receiving start signal SA. The control unit (threshold setting unit) 106 determines the power threshold TH according to the received electric field strength SI measured by the RSSI measurement unit 103 and sets the determined power threshold TH in the threshold comparison unit 104. Further, the control unit 106 determines whether the power threshold TH should be controlled (i.e., changed) or not based on the error detection result FL, which is the demodulation result of the demodulation unit 105.

<Details of Control Unit>

The control unit 106 determines the power threshold TH, which is used to determine the next packet reception, according to the received electric field strength SI in the current packet reception. For example, the control unit 106 stores a power threshold table in a memory (table storage unit) or the like in advance and sets the power threshold TH according to the received electric field strength SI based on the stored power threshold table.

Figure 8:
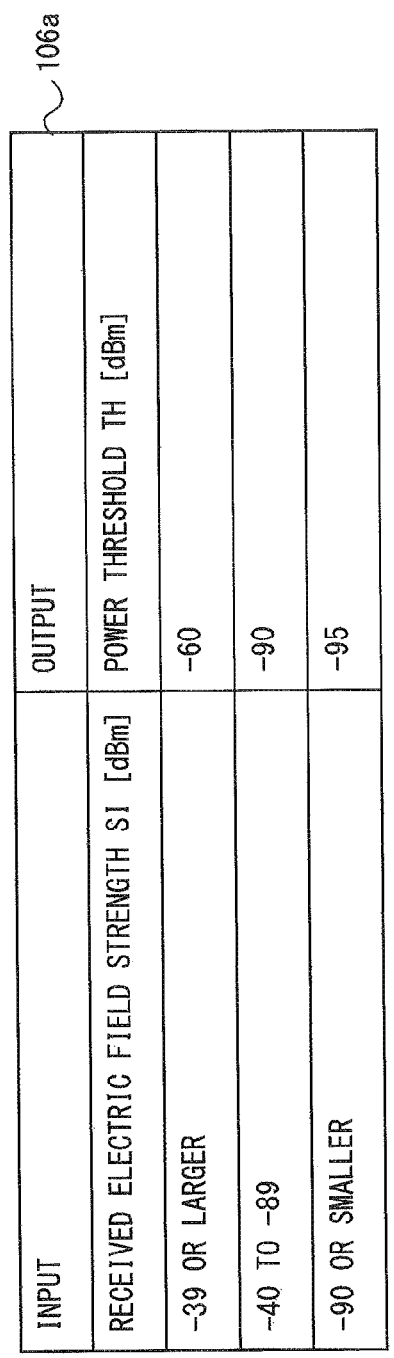
FIG. 8 shows an example of a power threshold table according to the first embodiment.

FIG. 8 shows an example of the power threshold table according to this embodiment. As shown in FIG. 8, a power threshold table 106*a* associates received electric field strengths SI, which are input to the control unit 106, with power thresholds TH, which are output from the control unit 106. That is, the power threshold table 106*a* associates measured electric field strengths SI with power thresholds TH to be set.

FIG. 8 shows an example in which the power threshold TH to be set has three levels. The control unit 106 outputs −60 dBm as a power threshold TH to be set when the received electric field strength SI is equal to or larger than −39 dBm, outputs −95 dBm as a power threshold TH to be set when the received electric field strength SI is equal to or smaller than −90 dBm, and outputs −90 dBm as a power threshold TH to be set when the received electric field strength SI is in a range between −40 dBm and −89 dBm. For example, in the example shown in FIG. 8, it can be said that the received electric field strength SI is compared with the threshold by using the reference values −40 dBm and −90 dBm as thresholds (i.e., as setting determination thresholds that are used to set the power threshold TH). When the received electric field strength SI is smaller than −90 dBm, the power threshold TH is set to −95 dBm (first threshold). When the received electric field strength SI is larger than −40 dBm, the power threshold TH is set to −60 dBm (second threshold larger than the first threshold). By doing so, when the received electric field strength SI is large (the distance is short), the power threshold TH is increased and the influence of interfering radio waves is thereby prevented or suppressed.

Note that the received electric field strength values and the power threshold values in the power threshold table 106*a* shown in FIG. 8 are merely examples and they may be changed. Further, although a relation between three power thresholds and three received electric field strengths is shown in FIG. 8, the number of power thresholds may be arbitrarily determined. For example, the number of power thresholds may be two or more than three. Further, the power threshold may be determined by using a calculation formula (program) instead of using the table shown in FIG. 8.

<Detail of RSSI Measurement Unit>

The RSSI measurement unit 103 estimates (measures) a received electric field strength (received signal strength) by performing, for example, a calculation shown by the below-shown Expression (1). In Expression (1), RSSI represents a received electric field strength and its unit is dBm. Further, n is the number of RSSI calculation data pieces; ADCO is an ADC output code ADOUT; $ADC_{0dBm}$ is an ADC output code when 0 dBm is input to the ADC 102; and RFgain is a dB value of the gain of the quadrature conversion circuit 101. In Expression (1), an average value of received electric field strengths over a certain period is obtained by dividing the sum total of n ADCO by n $ADC_{0dBm}$. The RSSI measurement unit 103 obtains an average value of received electric field strengths for each received signal (for each packet) by using Expression (1).

[Expression 1]

$$RSSI = 20\log\frac{\left(\sum_{k=1}^{n} |ADCO_k|\right)}{n \times ADC_{0dBm}} - RFgain \quad (1)$$

Further, when the output of the quadrature conversion circuit 101 is a complex output, the RSSI measurement unit 103 estimates (measures) a received electric field strength by performing a calculation shown by the below-shown Expression (2). In Expression (2), ADCOI and ADCOQ are I component and Q component, respectively, of an ADC output code.

[Expression 2]

$$RSSI = 20\log\frac{\sum_{k=1}^{n} \sqrt{ADCOI^2 + ADCOQ^2}}{n \times ADC_{0dBm}} - RFgain \quad (2)$$

<Relation Between Received Electric Field Strength and Communication Distance>

Base on the fact that a propagation loss in a free space is in proportion to the square of a frequency and in proportion to the square of a communication distance, the relation between the received electric field strength and the communication distance is expressed by the below-shown Expression (3), where: RXPOW [dBm] is a received electric field strength; TXPOW [dBm] is transmission power; f [MHz] is a carrier frequency; and d [m] is a communication distance.

$$RXPOW = TXPOW - 20\log(f) - 20\log(d) + 27.6 \quad (3)$$

That is, the communication distance between a transmitter and a receiver (between radio communication devices) can be calculated by substituting a received electric field strength into Expression (3).

In this embodiment, the power threshold TH for the next packet reception is determined mainly based on the received electric field strength SI. However, since the received electric field strength has a relation with the communication distance, it can be said that the power threshold TH is determined based on the communication distance.

That is, the control unit 106 may calculate the communication distance from the measured received electric field strength SI by using Expression (3) and set the power threshold TH according to the calculated communication distance. For example, the power threshold table 106a shown in FIG. 8 may be replaced by a table recording communication distances. That is, communication distances may be associated with power thresholds TH. Then, when the communication distance is equal to or shorter than 1 m, the power threshold TH is set to −60 dBm. When the theoretical value for the communication distance according to Expression (3) is equal to or longer than 320 m (or when the communication distance in the real space is equal to or longer than 10 m), the power threshold TH is set to −95 dBm. Further, when the communication distance is in a range between 1 m and 320 m, the power threshold TH is set to −90 dBm.

<Operation Flow of Semiconductor Device>

Figure 9:
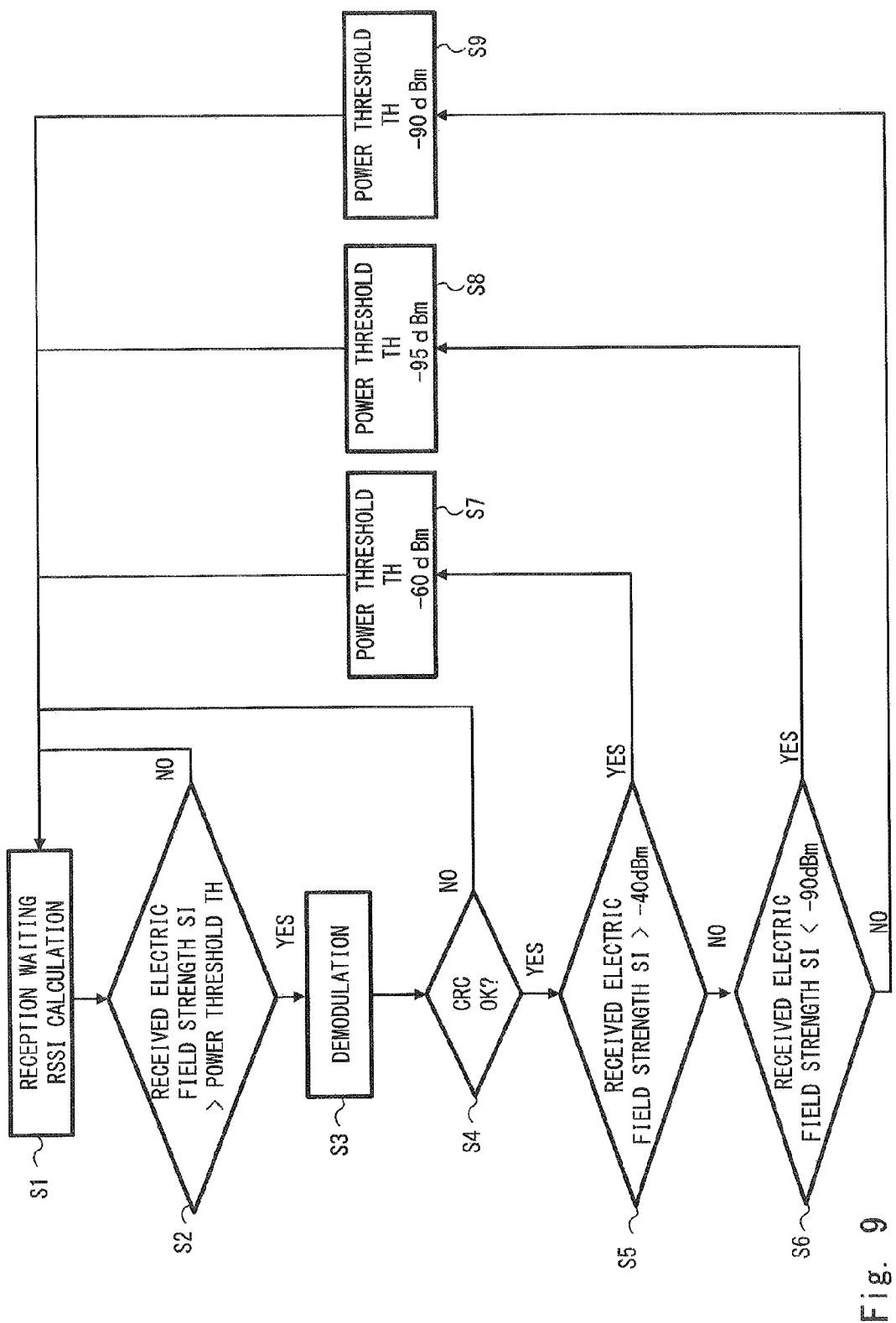
FIG. 9 is a flowchart showing an operation of the semiconductor device according to the first embodiment.

FIG. 9 is a flowchart showing an operation of the semiconductor device 100 according to this embodiment. FIG. 9 shows an operation corresponding to the example of the power threshold table 106a shown in FIG. 8.

Firstly, steps S1 and S2 show an operation that is performed when the semiconductor device 100 is waiting for a radio signal. In the step S1, when the antenna 111 receives a radio signal, the quadrature conversion circuit 101 performs a quadrature conversion on the received radio signal RF. Further, the ADC 102 converts the quadrature-converted analog quadrature signal IQ into a digital signal and the RSSI measurement unit 103 performs an RSSI calculation based on an ADC output code ADOUT obtained by the AD conversion. That is, the RSSI measurement unit 103 calculates a received electric field strength by using the above-shown Expression (1) or (2) and outputs an received electric field strength SI, which is the result of the received electric field strength estimation, to the threshold comparison unit 104.

In the step S2, the threshold comparison unit 104 compares the magnitude of the received electric field strength SI with a power threshold TH, i.e., determines whether or not the received electric field strength SI is larger than the power threshold TH. When the received electric field strength SI is equal to or smaller than the power threshold TH in the step S2, the process returns to the step S1, in which the semiconductor device 100 waits for a radio signal and have the RSSI measurement unit 103 estimate a received electric field strength again. When the received electric field strength SI is equal to or smaller than the power threshold TH, the threshold comparison unit 104 maintains the receiving start signal SA, which is output by the threshold comparison unit 104, at the low level. Therefore, the demodulation unit 105 does not perform demodulation.

Further, in the step S2, when the received electric field strength SI is larger than the power threshold TH, the process proceeds to a step S3 and the demodulation unit 105 starts demodulating the received signal. That is, when the received electric field strength SI is larger than the power threshold TH, the threshold comparison unit 104 changes the receiving start signal SA, which is output by the threshold comparison unit 104, to a high level and hence the demodulation unit 105 starts demodulating the received signal according to (or in response to) the receiving start signal SA.

Next, steps S3 and S4 show an operation that is performed when the demodulation unit 105 demodulates a received signal. In the step S3, the demodulation unit 105 demodulates the ADC output code ADOUT (received signal) output from the ADC 102. The demodulation unit 105 demodulates the received signal and detects, if any, an error in the demodulated data (packet) (i.e., data (packet) obtained by the demodulation) by performing a CRC calculation thereof. For example, in the case of Bluetooth Low Energy, a packet includes a preamble, an access address, payload data (PDU), and a CRC (Cyclic Redundancy Check). Therefore, the demodulation unit 105 performs the CRC calculation based on the access address and the payload data of the demodulated packet.

In the step S4, the demodulation unit 105 makes a decision on the error detection result obtained by the CRC calculation. That is, the demodulation unit 105 compares the CRC calculation result obtained in the step S3 with a CRC included in the demodulated data (packet). Then, when they match each other (CRC=OK), the demodulation unit 105 determines that there is no error in the demodulated data. On the other hand, when they do not match each other (CRC=NG), the demodulation unit 105 determines that there is an error(s) in the demodulated data. The demodulation unit 105 outputs the presence/absence of an error as an error detection result FL. That is, when there is an error in the demodulated data, the process returns to the step S1 without changing the power threshold TH and the semiconductor device 100 waits for a radio signal. On the other hand, when there is no error in the demodulated data, the process proceeds to a step S5 and the control unit 105 sets (i.e., changes) the power threshold TH. By maintaining the power threshold when there is an error and setting (i.e., changing) the power threshold when there is no error, the influence of interfering radio waves on the power threshold can be prevented or suppressed.

Next, steps S5 to S9 show a power threshold setting flow in this embodiment. Similarly to the power threshold table 106*a* shown in FIG. 8, in this example, when the received electric field strength SI is larger than −40 dBm (or equal to or larger than −39 dBm), the control unit 106 sets the power threshold TH for the next reception to −60 dBm. When the received electric field strength SI is smaller than −90 dBm (or equal to or smaller than −90 dBm), the control unit 106 sets the power threshold TH for the next reception to −95 dBm. Further, when the received electric field strength SI is no larger than −40 dBm and no smaller than −90 dBm (or in a range between −40 dBm and −89 dBm), the control unit 106 sets the power threshold TH for the next reception to −90 dBm.

In a step S5, the control unit 106 determines whether or not the received electric field strength SI is larger than −40 dBm. Then, when the received electric field strength SI is larger than −40 dBm, the control unit 106 sets the power threshold TH to −60 dBm and sets it in the threshold comparison unit 104 in a step S7. When the received electric field strength SI is equal to or smaller than −40 dBm in the step S5, the control unit 106 determines whether or not the received electric field strength SI is smaller than −90 dBm in the step S6. Then, when the received electric field strength SI is smaller than −90 dBm, the control unit 106 sets the power threshold TH to −95 dBm and sets it in the threshold comparison unit 104 in a step S8. On the other hand, when the received electric field strength SI is equal to or larger than −90 dBm in the step S6, the control unit 106 sets the power threshold TH to −90 dBm and sets it in the threshold comparison unit 104 in a step S9.

After setting the power threshold TH in the steps S7 to S9, the process returns to the step S1, in which the semiconductor device 100 waits for a radio wave again and determines a received electric field strength by using the set power threshold TH.

Note that in the flow shown in FIG. 9, only when there is no error in the CRC calculation result in the step S4, the power threshold TH is set in the step S5 and the subsequent steps. However, the step S4 may be omitted. That is, the power threshold TH may be set by unconditionally performing the processes in the step S5 and the subsequent steps after the demodulation is completed. Further, the operation flow from the step S1 to the step S9 may be implemented by a circuit (hardware) or may be implemented by software.

<Operation Waveform of Semiconductor Device>

Figure 10:
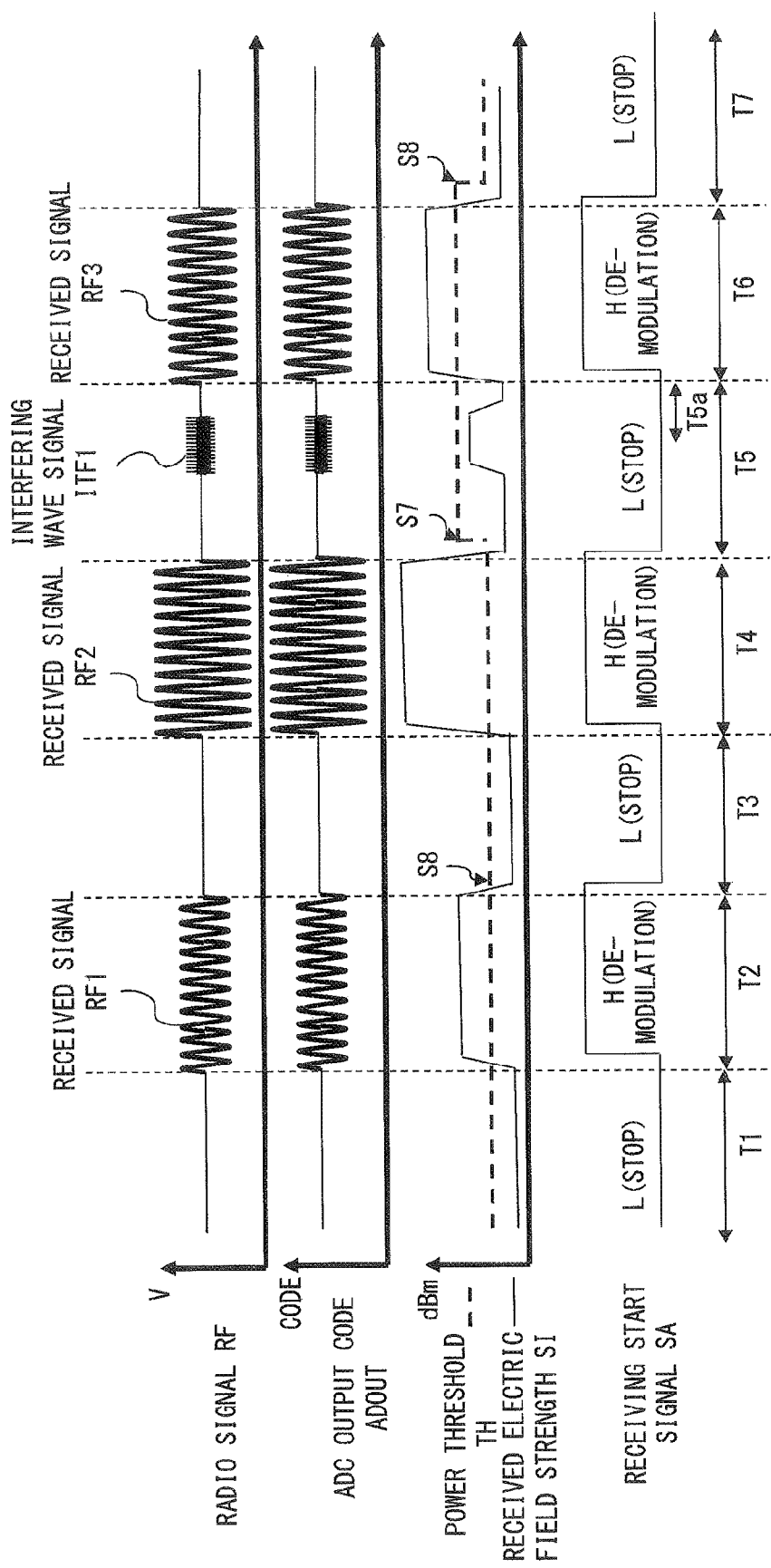
FIG. 10 is a signal waveform chart showing an operation of the semiconductor device according to the first embodiment.

FIG. 10 shows an example of waveforms of an operation according to this embodiment explained above with reference to the flowchart shown in FIG. 9. Similarly to the reference examples shown in FIGS. 2 and 4, changes in each signal are shown on the time base. Radio signals RF1, RF2 and RF3 are received at regular intervals in periods T2, 14 and T6, respectively, and an interfering radio-wave signal ITF1 is received in a period between the receptions of the received signals RF2 and RF3.

The operation waveforms shown in FIG. 10 are explained with reference to steps in the flowchart shown in FIG. 9. Firstly, in a period T1, since no signal is received at the antenna 111 (i.e., there is no signal), the levels of the radio signal RF output from the antenna 111 and the ADC output code ADOUT output from the ADC 102 do not change. Therefore, when the RSSI measurement unit 103 calculates an RSSI (step S1), the resulting received electric field strength SI is smaller than the power threshold TH (step S2). As a result, the receiving start signal SA remains at the low level and the demodulation unit 105 does not start demodulation. That is, the demodulation is in a stopped state.

Next, in a period T2, when the antenna 111 receives a received signal RF1 (packet), the levels of the radio signal RF and the ADC output code ADOUT change according to the received signal RF1. Therefore, when the RSSI measurement unit 103 calculates an RSSI (step S1), the resulting received electric field strength SI becomes larger than the power threshold TH (step S2). As a result, the receiving start signal SA becomes a high level and the demodulation unit 105 starts the demodulation of the received signal RF1 (step S3). When the demodulation of the received signal RF1 is completed, the receiving start signal SA is returned to a low level and the demodulation unit 105 stops the demodulation. Further, the control unit 106 checks whether there is no error in the demodulation result by using (i.e., performing) a CRC calculation. Here, assume that there is no error in the demodulation result. Then, the control unit 106 sets the power threshold TH for the next reception (steps S7 to S9) according to the received electric field strength SI of the received signal RF1 (steps S5 and S6) and returns to the radio-signal waiting state (step S1). For example, in a period T2, since the received electric field strength SI of the received signal RF1 is smaller than −90 dBm (steps S5 and S6), the power threshold TH is set to −95 dBm (i.e., the threshold does not change) (step S8).

Next, in a period T3, no signal is received at the antenna 111 as in the case of the period T1. Therefore, when the RSSI measurement unit 103 calculates an RSSI (step S1), the resulting received electric field strength SI is smaller than the power threshold TH (step S2) and the demodulation unit 105 remains in the demodulation stopped state.

Next, in a period T4, the antenna 111 receives a received signal RF2 as in the case of the period T2. Therefore, when the RSSI measurement unit 103 calculates an RSSI (step S1), the resulting received electric field strength SI becomes larger than the power threshold TH (step S2). As a result, the demodulation unit 105 performs the demodulation of the received signal RF2 (steps S3 and S4) and the control unit 106 sets the power threshold TH for the next reception (steps S7 to S9) according to the received electric field strength SI of the received signal RF2 (steps S5 and S6). For example, in the period T4, since the received electric field strength SI of the received signal RF2 is larger than −40 dBm (step S5), the power threshold TH is set to −60 dBm (i.e., the threshold is raised) (step S7).

Next, in the first half of a period T5, since no signal is received at the antenna 111 as in the case of the periods T1 and T3, demodulation is not started. When the antenna 111 receives an interfering radio-wave signal ITF1 in the second half T5a of the period T5, the levels of the radio signal RF and the ADC output code ADOUT change according to the interfering radio-wave signal ITF1. However, the power threshold TH was set to a high value, i.e., −60 dBm in the period T4. Therefore, even when the interfering radio-wave signal ITF1 is received, the received electric field strength SI, which is obtained as a result of the RSSI calculation performed by the RSSI measurement unit 103 (step S1), is smaller than the power threshold TH (step S2). Therefore, even when the interfering radio-wave signal ITF1 is received by the antenna 111 in the step S1, the receiving start signal SA remains at the low level and demodulation is not started.

Next, in a period T6, when the antenna 111 receives a received signal RF3 as in the case of the periods T2 and T4, the received electric field strength SI becomes larger than the power threshold TH and the control unit 106 sets the power threshold TH for the next reception (steps S7 to S9) according to the received electric field strength SI of the received signal RF3 (steps S5 and S6). For example, in the period T6, since the received electric field strength SI of the received signal RF3 is smaller than −90 dBm (steps S5 and S6), the power threshold TH is set to −95 dBm (i.e., the threshold is lowered) (step S8). In a step T7, demodulation is not started as in the case of the periods T1 and T3.

Advantageous Effect of this Embodiment

As described above, in this embodiment, the power threshold is set according to the received electric field strength (or the distance). As a result, the tolerance to interfering radio waves is improved in short-distance communication, thus making it possible to reduce the possibility of occurrences of false start-up of the receiver circuit due to interfering radio waves and thereby to reduce the power consumption.

In the reference examples 1 and 2 shown in FIGS. 2 and 4, when the power of received interfering radio waves changes over time, the demodulation unit mistakenly starts demodulation when, for example, an interfering radio wave equal to or larger than −90 dBm is received, thus causing an increase in the power consumption and deterioration in the communication characteristic. In contrast to this, in this embodiment, in the case of short-distance communication, no false reception is performed (no demodulation is started) by, for example, an interfering radio wave equal to or smaller than −60 dBm as shown in FIG. 10. Therefore, the tolerance to interfering radio waves is improved by 30 dB in comparison to the reference examples 1 and 2.

In mobile phone communication and the like, a distance between a base station and a terminal could drastically change in a short time due to a high-speed movement of the terminal. In contrast to this, in communication such as Bluetooth and a wireless LAN, since changes in the communication distance over time are very gentle, changes in the RSSI are also gentle. Therefore, even when an interfering radio wave whose power changes over time is received, it does not exceed the power threshold set in this embodiment. Therefore, it is possible to prevent or reduce false start-up of the demodulator and thereby to reduce the power consumption.

Second Embodiment

A second embodiment is explained hereinafter with reference to the drawings.
<Detail of Control Unit>
FIG. 11 shows a state machine diagram of the control unit 106 and its conditions for transitions among states according to the second embodiment. FIG. 12 shows power thresholds TH corresponding to the respective states shown in FIG. 11. Similarly to the first embodiment, power thresholds may be determined by using a power threshold table according to the states shown in FIG. 12 or determined by using a program. Note that the configuration of the second embodiment is similar to that of the first embodiment except for the control unit 106, and therefore the explanation thereof is omitted.

While the control unit 106 in the first embodiment, upon receiving a received electric field strength SI, outputs a power threshold TH by using the power threshold table 106a shown in FIG. 8, the control unit 106 in the second embodiment, upon receiving a received electric field strength SI, performs a state transition by using the state machine shown in FIG. 11 and outputs (sets) a power threshold TH corresponding to a respective state shown in FIG. 12. Similarly to the first embodiment, the states and the respective power thresholds TH are related to received electric field strengths and hence related to distances. For example, when the state ST1 corresponds to a distance between 1 m and 320 m (or 10 m in the real space), the state ST2 correspond to a distance shorter than 1 m and the state ST3 corresponds to a distance longer than 320 m.

As shown in FIG. 11, the control unit 106 has internal states including the states ST1 to ST3 and performs a state transition according to the respective transition conditions. For example, the control unit 106 stores its internal state in a memory or the like. Then, when the transition condition is met, the control unit 106 updates the stored internal state and thereby performs a state transition.

Each transition condition between states includes a condition for the received electric field strength SI and a condition for the number of consecutive receptions. The condition for the received electric field strength SI is a condition for determining whether or not the received electric field strength SI meets a reference value. The condition for the number of consecutive receptions is a condition for determining whether or not the number of consecutive receptions of received signals meets a reference number for the number of receptions. The number of consecutive receptions is the number of receptions in which a series of received signals are received in a row on a packet-by-packet basis (i.e., the number of consecutive receptions of packets). For each transition condition, the state is changed when the received signal (packet) meets the condition for the received electric field strength SI and the reception is consecutively performed a predetermined times.

A transition condition IF1 from the state ST1 (e.g., initial state) to the state ST2 is a condition for determining whether or not received signals whose received electric field strength SI is smaller than −40 dBm have been received more than cnt_th_M2L times in a row. When the transition condition IF1 is met, the control unit 106 changes its state from the state ST1 to the state ST2 and changes the power threshold TH from −90 dBm, which is the power threshold TH corresponding to the state ST1, to −60 dBm, which is the power threshold TH corresponding to the state ST2.

A transition condition IF2 from the state ST2 to the state ST1 is a condition for determining whether or not received signals whose received electric field strength SI is larger than −45 dBm have been received more than cnt_th_L2M times in a row. When the transition condition IF2 is met, the control unit 106 changes its state from the state ST2 to the state ST1 and changes the power threshold TH from −60 dBm, which is the power threshold TH corresponding to the state ST2, to −90 dBm, which is the power threshold TH corresponding to the state ST1.

A transition condition IF3 from the state ST1 to a state ST3 is a condition for determining whether or not received signals whose received electric field strength SI is larger than −90 dBm have been received more than cnt_th_M2H times in a row. When the transition condition IF3 is met, the control unit 106 changes its state from the state ST1 to the state ST3 and changes the power threshold TH from −90 dBm, which is the power threshold TH corresponding to the state ST1, to −95 dBm, which is the power threshold TH corresponding to the state ST3.

A transition condition IF4 from the state ST3 to the state ST1 is a condition for determining whether or not received signals whose received electric field strength SI is smaller than −85 dBm have been received more than cnt_th_H2M times in a row. When the transition condition IF4 is met, the control unit 106 changes its state from the state ST3 to the state ST1 and changes the power threshold TH from −95 dBm, which is the power threshold TH corresponding to the state ST3, to −90 dBm, which is the power threshold TH corresponding to the state ST1.

The numbers cnt_th_M2L, cnt_th_L2M, cnt_th_H2M, and cnt_th_M2H (reference numbers for the number of consecutive receptions) are arbitrary integers. By setting large numbers to these numbers, it is possible to prevent the state from being mistakenly changed due to interfering radio waves or noises. In the example shown in FIG. 11, the value in the transition condition IF1 from the state ST1 to the state ST2 differs from that in the transition condition IF2 from the state ST2 to the state ST1, and the value in the transition condition IF3 from the state ST1 to the state ST3 differs from that in the transition condition IF4 from the state ST3 to the state ST1. That is, they have hysteresis. In particular, the reference value (−40 dBm) for the received electric field strength in the transition condition IF1 is higher than the reference value (−45 dBm) for the received electric field strength in the transition condition IF2, and the reference value (−90 dBm) for the received electric field strength in the transition condition IF3 is lower than the reference value (−85 dBm) for the received electric field strength in the transition condition IF4. In this way, it is possible to prevent the state from being wastefully changed due to small fluctuations in the radio signal.

<Operation Flow of Semiconductor Device>

Figure 13:
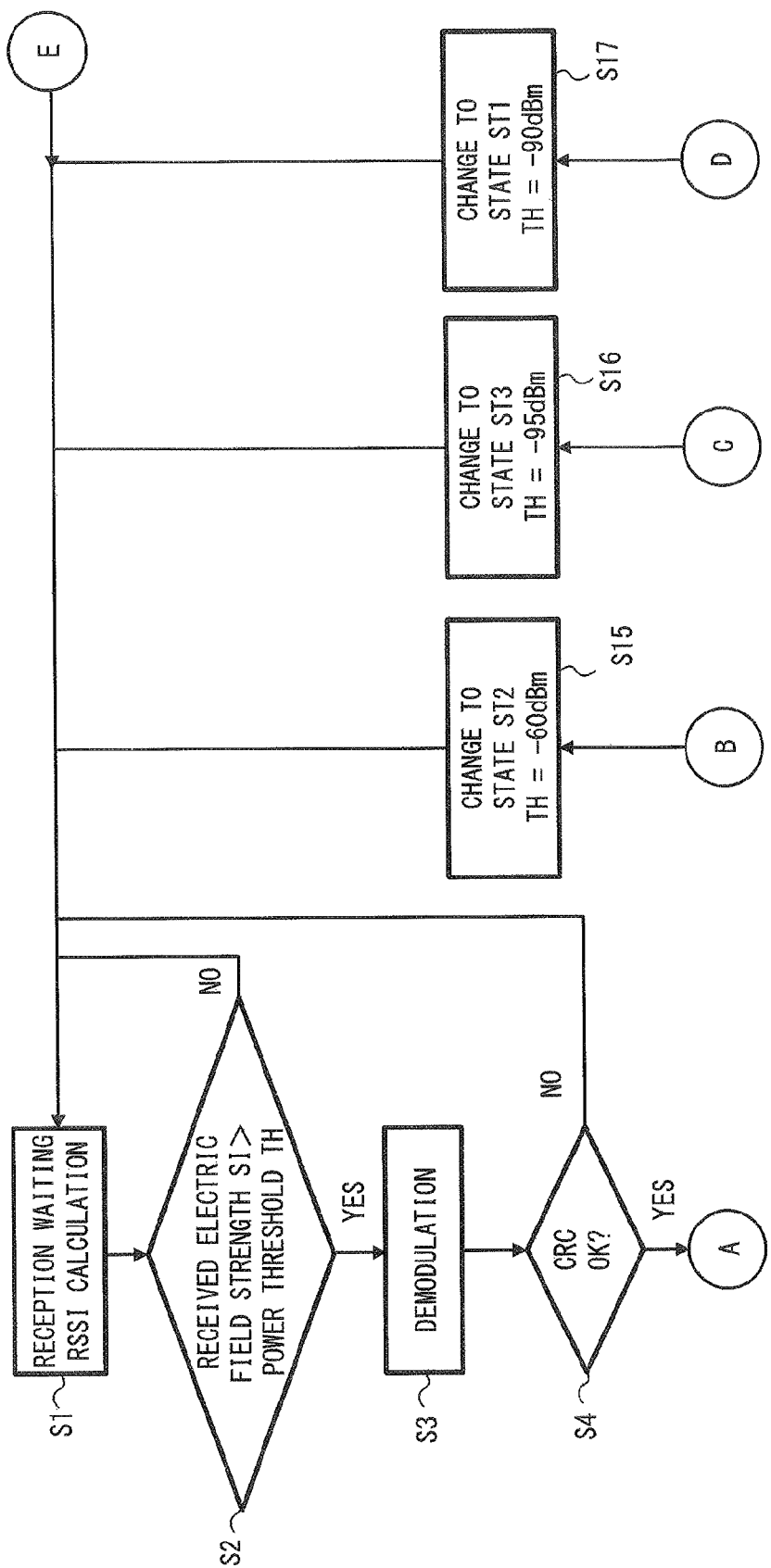
FIG. 13 is a flowchart showing an operation of the semiconductor device according to the second embodiment.
Figure 14:
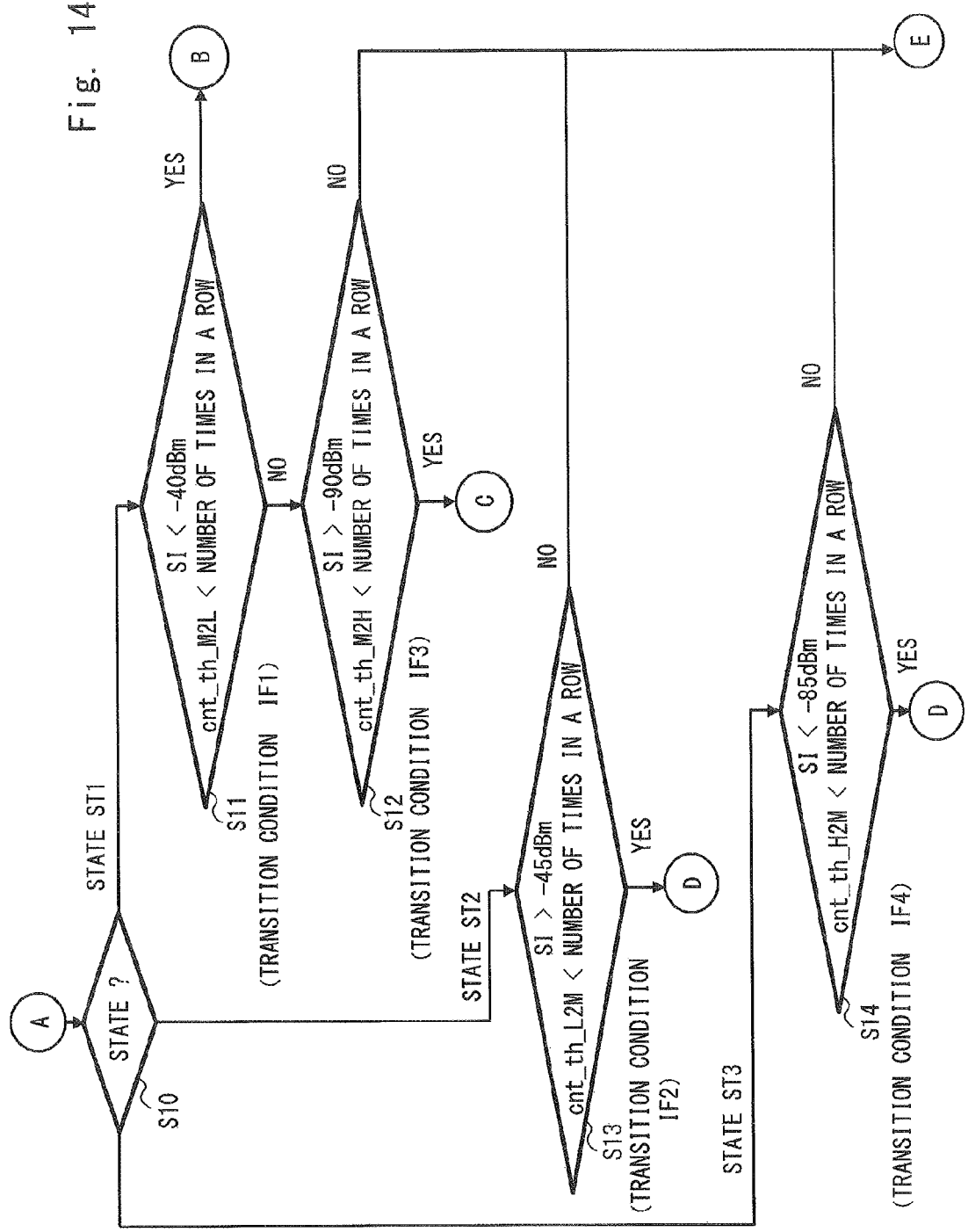
FIG. 14 is a flowchart showing an operation of the semiconductor device according to the second embodiment.

FIGS. 13 and 14 show a flowchart showing an operation of the semiconductor device 100 according to this embodiment.

As shown in FIGS. 13 and 14, firstly, in steps S1 to S4, when a radio signal is received, an RSSI is calculated (step S1) as in the case of the first embodiment. Then, when the received electric field strength SI exceeds the power threshold TH (step S2), demodulation is performed (step S3) and a CRC calculation result is checked (step S4).

Next, steps S10 to S17 show a power threshold setting flow in this embodiment. When there is no error in the CRC calculation result, the control unit 106 makes a decision on the transition condition corresponding to the current state and performs a state transition and the setting of the power threshold TH according to the result of the decision on the transition condition.

In a step S10, the control unit 106 determines the current state. Then, when the current state is the state ST1, the control unit 106 makes a decision on the transition condition IF1 in a step S11. In the step S11, the control unit 106 determines whether or not the received electric field strength SI is smaller than −40 dBm and the number of consecutive receptions exceeds the number cnt_th_M2L. When the number of consecutive receptions in which received signals having an received electric field strength SI smaller than −40 dBm are received in a row is larger than the number cnt_th_M2L, the control unit 106 changes its state from the state ST1 to the state ST2, and sets the power threshold TH to −60 dBm and sets it in the threshold comparison unit 104 in a step S15.

Further, when the received electric field strength SI is equal to or larger than −40 dBm or the number of consecutive receptions in which received signals having an received electric field strength SI smaller than −40 dBm are received in a row is equal to or smaller than the number cnt_th_M2L in the step S11, the control unit 106 makes a decision on the transition condition IF3 in a step S12. In the step S12, the control unit 106 determines whether or not the received electric field strength SI is larger than −90 dBm and the number of consecutive receptions exceeds the number cnt_th_M2H. When the received electric field strength SI is equal to or smaller than −90 dBm or the number of consecutive receptions in which received signals having an received electric field strength SI larger than −90 dBm are received in a row is equal to or smaller than the number cnt_th_M2H, the control unit 106 does not change its state and returns to the step S1 in which the semiconductor device 100 waits for a radio signal. Further, when the number of consecutive receptions in which received signals having an received electric field strength SI larger than −90 dBm are received in a row is larger than the number cnt_th_M2H, the control unit 106 changes its state from the state ST1 to the state ST3, and sets the power threshold TH to −95 dBm and sets it in the threshold comparison unit 104 in a step S16.

In the step S10, when the current state is the state ST2, the control unit 106 makes a decision on the transition condition IF2 in a step S13. In the step S13, the control unit 106 determines whether or not the received electric field strength SI is larger than −45 dBm and the number of consecutive receptions exceeds the number cnt_th_L2M. When the received electric field strength SI is equal to or smaller than −45 dBm or the number of consecutive receptions in which received signals having an received electric field strength SI larger than −45 dBm are received in a row is equal to or smaller than the number cnt_th_L2M, the control unit 106 does not change its state and returns to the step S1 in which the semiconductor device 100 waits for a radio signal. Further, when the number of consecutive receptions in which received signals having an received electric field strength SI larger than −45 dBm are received in a row is larger than the number cnt_th_L2M, the control unit 106 changes its state from the state ST2 to the state ST1, and sets the power threshold TH to −90 dBm and sets it in the threshold comparison unit 104 in a step S17.

In the step S10, when the current state is the state ST3, the control unit 106 makes a decision on the transition condition IF4 in a step S14. In the step S14, the control unit 106 determines whether or not the received electric field strength SI is smaller than −85 dBm and the number of consecutive receptions exceeds the number cnt_th_H2M. When the received electric field strength SI is equal to or larger than −85 dBm or the number of consecutive receptions in which received signals having an received electric field strength SI smaller than −85 dBm are received in a row is equal to or smaller than the number cnt_th_H2M, the control unit 106 does not change its state and returns to the step S1 in which the semiconductor device 100 waits for a radio signal. Further, when the number of consecutive receptions in which received signals having an received electric field strength SI smaller than −85 dBm are received in a row is larger than the number cnt_th_H2M, the control unit 106 changes its state from the state ST3 to the state ST1, and sets the power threshold TH to −90 dBm and sets it in the threshold comparison unit 104 in a step S17.

Advantageous Effect of this Embodiment

As described above, in this embodiment, the state is changed according to the received electric field strength (or the distance) and the power threshold is set for each state (i.e., set according to the state). In this way, since the power threshold is set according to the received electric field strength (or the distance), the power consumption can be reduced as in the case of the first embodiment.

Further, by setting large numbers to the number cnt_th_M2L, cnt_th_L2M, cnt_th_H2M, and cnt_th_M2H, it is possible to prevent the state from being mistakenly changed due to interfering radio waves or multipath fading. Further, by providing hysteresis for the reference values in the transition conditions that are used for the magnitude comparison of the received electric field strength SI as shown in FIG. 11, it is possible to further prevent the state from being mistakenly changed due to interfering radio waves or multipath fading. The reference values for which the hysteresis is provided are determined, for example, by performing evaluations or/and simulations.

Third Embodiment

Figure 15:
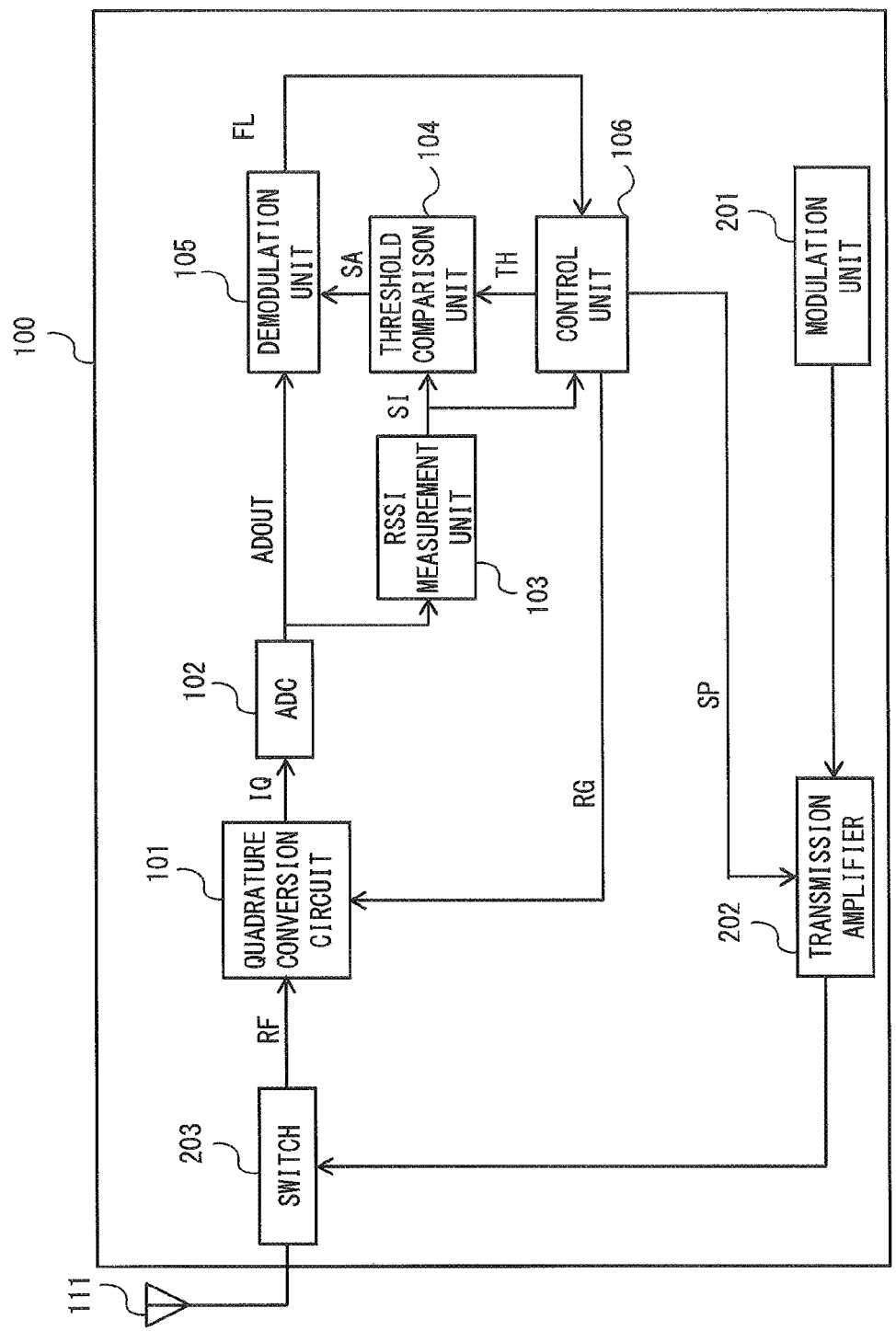
FIG. 15 is a configuration diagram showing a configuration of a semiconductor device according to a third embodiment.

A third embodiment is explained hereinafter with reference to the drawings.
<Configuration Semiconductor Device>
FIG. 15 shows a configuration diagram of a semiconductor device 100 according to a third embodiment. In comparison to the configuration of the first embodiment shown in FIG. 7, the configuration shown in FIG. 15 additionally includes a modulation unit 201, which is a transmission circuit, a transmission amplifier 202, and a switch 203 that switches between the transmission circuit and the reception circuit. Further, the configuration shown in FIG. 15 also includes, as control signals, a reception gain RG that is used to set a reception gain of the quadrature conversion circuit 101 and a transmission power SP that is supplied from the control unit 106 to the transmission amplifier 202 and used to set transmission power of the transmission amplifier 202.

In a transmitting operation, the modulation unit 201 modulates transmission data and the transmission amplifier 202 amplifies its signal amplitude to transmission power that is set according to the transmission power SP. The switch 203 connects the antenna 111 with the transmission amplifier 202 in a transmitting operation, and connects the antenna 111 with the quadrature conversion circuit 101 in a receiving operation.
<Detail of Control Unit>
In this embodiment, the control unit 106 sets the transmission power SP and the reception gain RG in addition to the power threshold TH according to the received electric field strength SI. For example, the control unit 106 serves as a transmission power setting unit that sets transmission power in addition to serving as the threshold setting unit that sets the power threshold TH. Further, the control unit 106 also serves as a reception gain setting unit that sets a reception gain. FIG. 16 shows a control table 106*b* possessed by the control unit 106 according to this embodiment. Compared to the power threshold table 106*a* in the first embodiment, the control table 106*b* additionally includes (i.e., records) transmission powers SP and reception gains RG. For example, the control unit 106 stores the control table in a memory or the like in advance. Then, the control unit 106 sets the power threshold TH, the transmission power SP, and the reception gain RG according to the received electric field strength SI based on the stored control table. Note that similarly to the first embodiment, the power threshold, the transmission power, and/or the reception gain may be determined by using a calculation formula(s) (program) instead of using the table shown in FIG. 16. Further, similarly to the second embodiment, the power threshold, the transmission power, and/or the reception gain may be associated with the states ST1 to ST3 and set according to the state transition. Note that only one or two of the power threshold, the transmission power, and the reception gain may be set.

Figure 17:
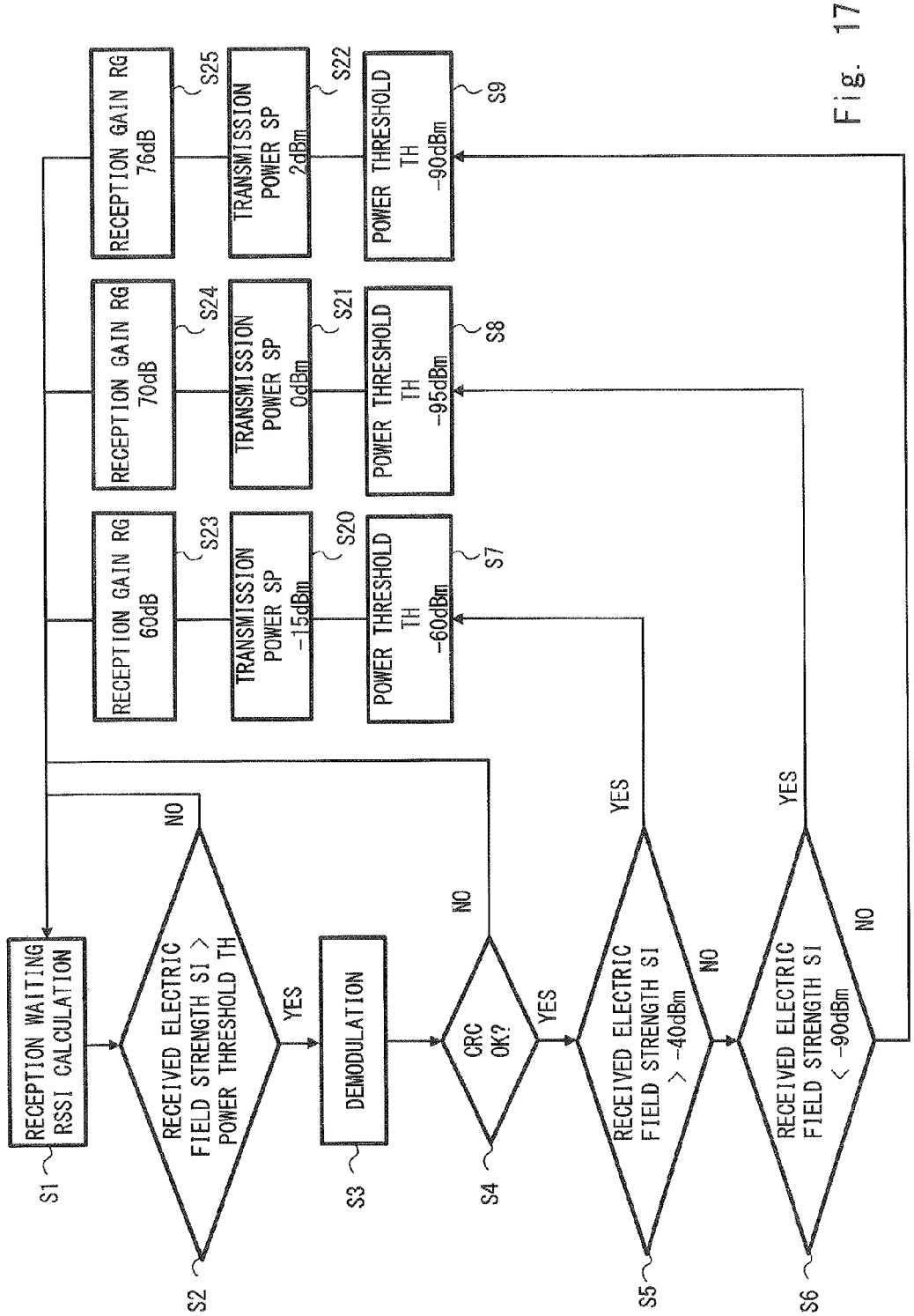
FIG. 17 is a flowchart showing an operation of the semiconductor device according to the third embodiment.

In the example shown in FIG. 16, when the received electric field strength SI is equal to or larger than −39 dBm, the control unit 106 outputs −60 dBm as a power threshold TH to be set, −15 dBm as a transmission power SP to be set, and 60 dB as a reception gain RG to be set. When the received electric field strength SI is equal to or smaller than −90 dBm, the control unit 106 outputs −95 dBm as a power threshold TH to be set, 2 dBm as a transmission power SP to be set, and 76 dB as a reception gain RG to be set. Further, when the received electric field strength SI is between −40 dBm and −89 dBm, the control unit 106 outputs −90 dBm as a power threshold TH to be set, 0 dBm as a transmission power SP to be set, and 70 dB as a reception gain RG to be set. Note that the distance may be used instead of using the received electric field strength SI as in the case of the first embodiment.
<Operation Flow of Semiconductor Device>
FIG. 17 is a flowchart showing an operation of the semiconductor device 100 according to this embodiment. In comparison to the flowchart in the first embodiment shown in FIG. 9, the flowchart shown in FIG. 17 additionally includes steps S20 to S25.

As shown in FIG. 17, firstly, in steps S1 to S4, when a radio signal is received, an RSSI is calculated (step S1) as in the case of the first embodiment. Then, when the received electric field strength SI exceeds the power threshold TH (step S2), demodulation is performed (step S3) and a CRC calculation result is checked (step S4).

In a step S5, the control unit 106 determines whether or not the received electric field strength SI is larger than −40 dBm. Then, when the received electric field strength SI is larger than −40 dBm, the control unit 106 sets the power threshold TH to −60 dBm and sets it in the threshold comparison unit 104 in a step S7. Further, the control unit 106 sets the transmission power SP to −15 dBm and sets it in the transmission amplifier 202 in a step S20, and sets the reception gain RG to 60 dB and sets it in the quadrature conversion circuit 101 in a step S23.

Further, when the received electric field strength SI is equal to or smaller than −40 dBm, the control unit 106 determines whether or not the received electric field strength SI is smaller than −90 dBm in a step S6. Then, when the received electric field strength SI is smaller than −90 dBm, the control unit 106 sets the power threshold TH to −95 dBm and sets it in the threshold comparison unit 104 in a step S8. Further, the control unit 106 sets the transmission power SP to 0 dBm and sets it in the transmission amplifier 202 in a step S21 and sets the reception gain RG to 70 dB and sets it in the quadrature conversion circuit 101 in a step S24.

Further, when the received electric field strength SI is equal to or larger than −90 dBm, the control unit 106 sets the power threshold TH to −90 dBm and sets it in the threshold comparison unit 104 in a step S9. Further, the control unit 106 sets the transmission power SP to 2 dBm and sets it in the transmission amplifier 202 in a step S22 and sets the reception gain RG to 76 dB and sets it in the quadrature conversion circuit 101 in a step S25.

Advantageous Effect of this Embodiment

As shown in the above-shown Expression (3), since the received electric field strength SI is in proportion to the square of the communication distance, the communication distance can be estimated from the received electric field strength SI. When the communication distance is short, the propagation loss in a free space is small. Therefore, the power consumption in the transmission amplifier can be reduced by setting a small value to the transmission power SP. On the other hand, when the communication distance is long, the propagation loss in a free space is large. Therefore, communication can be performed in a longer distance by setting a large value to the transmission power SP.

In the third embodiment, when the received electric field strength SI is large, the reception gain RG is reduced by using the control table shown in FIG. 16. The power consumption can be reduced by reducing the reception gain RG. However, when the reception gain RG is reduced, the NF (Noise Factor) of the quadrature conversion circuit 101 increases.

The below-shown Expression (4) shows a relation between the received electric field strength and the C/N (Carrier per Noise). In the expression, CN is C/N [dB] in an antenna; RXPOW is a received electric field strength [dBm]; B is a bandwidth [Hz]; k is Boltzmann constant ($1.38 \times 10^{-23}$ [J/Hz]); and T is a temperature [K].

$$CN = RXPOW - (10 \log(B) - 10 \log(kT)) \quad (4)$$

When the C/N satisfies a condition expressed by the below-shown Expression (5), demodulation is possible. In the expression, CNR is a required CNR (Carrier to Noise Ratio), i.e., represents C/N [dB] with which the demodulation unit 105 can perform demodulation, and NF (Noise Figure) represents a noise factor [dB] in the quadrature conversion circuit 101.

$$CN > CNR + NF \quad (5)$$

By substituting the above-shown Expression (5) into the above-shown Expression (4), the below-shown Expression (6) is obtained.

$$RXPOW - NF > CNR + 10 \log(B) - 10 \log(kT) \quad (6)$$

Based on the above-shown Expression (6), when the RXPOW (received electric field strength SI) is large, demodulation can be performed even when the NF (Noise Factor) of the quadrature conversion circuit 101 is increased. Therefore, an advantageous effect that the power consumption can be reduced can be achieved. As described above, in this embodiment, the power threshold, the transmission power, and/or the reception gain are set according to the received electric field strength (or the distance). In this way, since the transmission power and the reception gain as well as the power threshold can be set to their optimal values, the power consumption can be reduced even further.

Further, the program in the above-described embodiments can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random. Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The present invention made by the inventors has been explained above in a specific manner based on embodiments. However, the present invention is not limited to the above-described embodiments, and needless to say, various modifications can be made without departing from the spirit and scope of the present invention.

The first, second and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device, comprising:
a receiving unit that receives a radio signal;
a received signal strength measurement unit that measures a received signal strength of the received radio signal;
a threshold comparison unit that compares the measured received signal strength with a threshold;
a demodulation unit that demodulates the received radio signal based on a result of the comparison; and
a threshold setting unit that sets the threshold according to the measured received signal strength,
wherein the measured received signal strength at is input to the threshold setting unit is a same as the measured received signal strength that is input to the threshold comparison unit.

2. The semiconductor device according to claim 1, wherein the threshold setting unit sets the threshold based on a distance corresponding to the received signal strength.

3. The semiconductor device according to claim 1, further comprising a storage unit that stores a threshold table for associating the received signal strength with the threshold,
wherein the threshold setting unit refers to the threshold table and sets the threshold corresponding to the received signal strength.

4. The semiconductor device according to claim 1, wherein, when there is no error in a demodulation result, the threshold setting unit sets the threshold according to the received signal strength.

5. The semiconductor device according to claim 1, wherein the threshold setting unit sets the threshold based on a result of a comparison between a setting determination threshold and the received signal strength, the setting determination threshold being used for setting the threshold.

6. The semiconductor device according to claim 5, wherein the threshold setting unit sets a first threshold to the threshold when the received signal strength is smaller than the setting determination threshold and sets a second threshold to the threshold when the received signal strength is larger than the setting determination threshold, the second threshold being larger than the first threshold.

7. The semiconductor device according to claim 1, wherein the threshold setting unit sets the threshold based on a received signal state corresponding to the received signal strength.

8. The semiconductor device according to claim 7, wherein, when the received signal strength meets a state transition condition corresponding to the received signal state, the threshold setting unit changes its state to the received signal state and sets the threshold according to the changed received signal state.

9. The semiconductor device according to claim 8, wherein the state transition condition includes a condition for determining the number of receptions of radio signals having a predetermined received signal strength.

10. The semiconductor device according to claim 8, wherein, when a first state transition condition is met, the threshold setting unit changes its state from a first received signal state to a second received signal state, and
wherein, when a second state transition condition is met, the threshold setting unit changes its state from the second received signal state to the first received signal state, the second state transition condition being different from the first state transition condition.

11. The semiconductor device according to claim 1, further comprising a reception gain setting unit that sets a reception gain of the receiving unit according to the measured received signal strength.

12. The semiconductor device according to claim 1, further comprising:
a transmitting unit that transmits a radio signal according to transmission data; and
a transmission power setting unit that sets transmission power of the transmitting unit according to the measured received signal strength.

13. A radio communication device, comprising:
an antenna;
a receiving unit that receives a radio signal through the antenna;
a received signal strength measurement unit that measures a received signal strength of the received radio signal;
a threshold comparison unit that compares the measured received signal strength with a threshold;
a demodulation unit that demodulates the received radio signal based on a result of the comparison; and
a threshold setting unit that sets the threshold according to the measured received signal strength,
wherein the measured received signal strength that is input to the threshold setting unit is a same as the measured received signal strength that is input to the threshold comparison unit.

14. A method for controlling a radio communication device including an antenna, the method comprising:
receiving a radio signal through the antenna;
measuring a received signal strength of the received radio signal;
comparing the measured received signal strength with a threshold;
demodulating the received radio signal based on a result of the comparison; and
setting the threshold according to the measured received signal strength,
wherein the measured received signal strength that is used in the setting the threshold is a same as the measured receive signal strength that is used in the comparing the measured received signal strength with the threshold.

15. The semiconductor device according to claim 1, wherein the received signal strength measurement unit sends the same measured received signal strength to the threshold setting unit and to the threshold comparison unit.

16. The semiconductor device according to claim 1, wherein the received signal strength measurement unit directly sends the same measured received signal strength to the threshold setting unit and to the threshold comparison unit.

17. The semiconductor device according to claim 1, wherein, when there is no error in a demodulation result, the threshold setting unit sets the threshold according to the measured received signal strength, and
wherein, when there is the error in the demodulation result, the threshold setting unit maintains a current threshold.

18. The radio communication device according to claim 13, wherein the received signal strength measurement unit sends the same measured received signal strength to the threshold setting unit and to the threshold comparison unit.

19. The radio communication device according to claim 13, wherein the received signal strength measurement unit directly sends the same measured received signal strength to the threshold setting unit and to the threshold comparison unit.

20. The radio communication device according to claim 13, wherein, when there is no error in a demodulation result, the threshold setting unit sets the threshold according to the measured received signal strength, and
wherein, when there is the error in the demodulation result, the threshold setting unit maintains a current threshold.

* * * * *